(12) United States Patent
Ryon et al.

(10) Patent No.: US 11,525,404 B2
(45) Date of Patent: Dec. 13, 2022

(54) TORCH IGNITER COOLING SYSTEM

(71) Applicant: Delavan Inc., Des Moines, IA (US)

(72) Inventors: Jason Ryon, Carlisle, IA (US); Lev Alexander Prociw, Johnston, IA (US)

(73) Assignee: Delavan Inc., Des Moines, IA (US)

( * ) Notice: Subject to any disclaimer, the term of this patent is extended or adjusted under 35 U.S.C. 154(b) by 0 days.

(21) Appl. No.: 17/089,236

(22) Filed: Nov. 4, 2020

(65) Prior Publication Data

US 2022/0136444 A1    May 5, 2022

(51) Int. Cl.
  *F02C 7/264*     (2006.01)
  *F02C 7/18*      (2006.01)
  *F23R 3/06*      (2006.01)

(52) U.S. Cl.
  CPC ............. *F02C 7/264* (2013.01); *F02C 7/18* (2013.01); *F23R 3/06* (2013.01); *F23R 2900/00009* (2013.01); *F23R 2900/03043* (2013.01)

(58) Field of Classification Search
  CPC .. F02C 7/18; F02C 7/264; F02C 7/266; F23R 3/06; F23R 2900/00009; F23R 2900/03043
  See application file for complete search history.

(56) References Cited

U.S. PATENT DOCUMENTS

| 2,540,642 A | 2/1951 | Allen et al. |
| 2,541,900 A | 2/1951 | Williams |
| 2,645,082 A | 7/1953 | Sarto |
| 2,648,951 A | 8/1953 | McDougal |
| 2,811,676 A | 10/1957 | Smits |
| 2,840,742 A | 6/1958 | Watters |
| 2,847,826 A | 8/1958 | Dennis |
| 2,864,234 A | 12/1958 | Seglem et al. |
| 2,885,859 A | 5/1959 | Barberis |

(Continued)

FOREIGN PATENT DOCUMENTS

| DE | 1064760 B | 9/1959 |
| DE | 102018214281 B3 | 8/2019 |

(Continued)

OTHER PUBLICATIONS

Extended European Search Report for EP Application No. 21192156.4, dated Feb. 1, 2022, 7 pages.

(Continued)

*Primary Examiner* — Arun Goyal
*Assistant Examiner* — Henry Ng
(74) *Attorney, Agent, or Firm* — Kinney & Lange, P.A.

(57) ABSTRACT

An embodiment of a torch igniter for a combustor of a gas turbine engine comprises a combustion chamber oriented about an axis, a cap defining an axially upstream end of the combustion chamber and oriented about the axis, a tip defining an axially downstream end of the combustion chamber, a structural wall coaxial with and surrounding the igniter wall, an outlet passage defined by the igniter wall within the tip, and a cooling system. The cooling system comprises an air inlet formed within the structural wall, a first flow path disposed between the structural wall and the igniter wall, and an aperture extending through the igniter wall transverse to the flow direction. The aperture directly fluidly connects the first flow path to the combustion chamber.

18 Claims, 18 Drawing Sheets

(56) References Cited

U.S. PATENT DOCUMENTS

| | | | |
|---|---|---|---|
| 2,958,196 A | 11/1960 | Wie et al. | |
| 2,967,224 A | 1/1961 | Irwin | |
| 3,009,321 A | 11/1961 | Jones et al. | |
| 3,487,636 A | 1/1970 | Scott et al. | |
| 3,558,251 A | 1/1971 | Bauger et al. | |
| 3,690,093 A | 9/1972 | Carlisle | |
| 3,898,797 A | 8/1975 | Wood | |
| 3,954,389 A | 5/1976 | Szetela | |
| 3,990,834 A | 11/1976 | Dubell et al. | |
| 4,012,904 A | 3/1977 | Nogle | |
| 4,099,373 A | 7/1978 | Griffin et al. | |
| 4,112,675 A | 9/1978 | Pillsbury et al. | |
| 4,192,139 A | 3/1980 | Buchheim | |
| 4,194,358 A | 3/1980 | Stenger | |
| 4,351,156 A | 9/1982 | White et al. | |
| 4,412,414 A | 11/1983 | Novick et al. | |
| 4,441,323 A | 4/1984 | Colley | |
| 4,860,533 A | 8/1989 | Joshi | |
| 4,912,931 A | 4/1990 | Joshi et al. | |
| 4,915,615 A | 4/1990 | Kawamura et al. | |
| 5,085,040 A | 2/1992 | Tilston | |
| 5,390,855 A | 2/1995 | Mims et al. | |
| 5,469,700 A | 11/1995 | Corbett et al. | |
| 5,499,497 A | 3/1996 | Defreitas | |
| 5,636,511 A | 6/1997 | Pfefferle et al. | |
| 5,640,841 A | 6/1997 | Crosby | |
| 5,673,554 A | 10/1997 | Defreitas et al. | |
| 5,695,328 A | 12/1997 | Defreitas et al. | |
| 5,720,163 A | 2/1998 | Pfefferle et al. | |
| 5,845,480 A | 12/1998 | Defreitas et al. | |
| 6,138,654 A * | 10/2000 | Pretorius | F02P 15/003 123/406.41 |
| 6,195,247 B1 | 2/2001 | Cote et al. | |
| 6,240,731 B1 | 6/2001 | Hoke et al. | |
| 6,247,300 B1 | 6/2001 | Muramatsu et al. | |
| 6,483,022 B1 | 11/2002 | Packard | |
| 6,884,967 B1 | 4/2005 | Leigh | |
| 6,915,638 B2 | 7/2005 | Runkle et al. | |
| 6,952,927 B2 | 10/2005 | Howell et al. | |
| 6,968,699 B2 | 11/2005 | Howell et al. | |
| 7,124,724 B2 | 10/2006 | Fleetwood | |
| 7,137,255 B2 | 11/2006 | Schmotolocha et al. | |
| 7,216,488 B2 | 5/2007 | Howell et al. | |
| 7,470,875 B1 | 12/2008 | Wilcox et al. | |
| 7,481,248 B2 | 1/2009 | Prociw et al. | |
| 7,637,094 B2 | 12/2009 | Costello et al. | |
| 8,365,710 B2 | 2/2013 | Lykowski et al. | |
| 8,713,944 B2 | 5/2014 | Bleeker | |
| 9,080,772 B2 | 7/2015 | Prociw et al. | |
| 9,135,755 B2 | 9/2015 | Youssef | |
| 9,279,398 B2 | 3/2016 | McAlister | |
| 9,413,141 B2 | 8/2016 | Leglaye et al. | |
| 9,453,491 B2 | 9/2016 | Tanaka et al. | |
| 9,476,399 B1 | 10/2016 | Munson | |
| 9,567,912 B2 | 2/2017 | Prociw et al. | |
| 10,041,859 B2 | 8/2018 | Desilva et al. | |
| 10,156,189 B2 | 12/2018 | Sze et al. | |
| 10,488,047 B2 | 11/2019 | Ott et al. | |
| 10,584,639 B2 | 3/2020 | Dam et al. | |
| 10,711,699 B2 | 7/2020 | Dam et al. | |
| 10,823,398 B2 | 11/2020 | Choudhri et al. | |
| 11,209,164 B1 * | 12/2021 | Ryon | F23R 3/283 |
| 11,226,103 B1 * | 1/2022 | Ryon | F02C 3/04 |
| 11,255,535 B1 | 2/2022 | Eckert et al. | |
| 2002/0050061 A1 | 5/2002 | Komyoji et al. | |
| 2002/0162333 A1 | 11/2002 | Zelina | |
| 2004/0050061 A1 | 3/2004 | Schmotolocha et al. | |
| 2004/0168442 A1 | 9/2004 | Schmotolocha et al. | |
| 2005/0053876 A1 | 3/2005 | Joos et al. | |
| 2005/0166595 A1 | 8/2005 | Fletcher et al. | |
| 2005/0284442 A1 | 12/2005 | Stuttaford et al. | |
| 2006/0054233 A1 | 3/2006 | Prociw et al. | |
| 2006/0168967 A1 | 8/2006 | Simons et al. | |
| 2008/0036209 A1 | 2/2008 | Bulkovitch | |
| 2008/0141651 A1 | 6/2008 | Eason et al. | |
| 2009/0234555 A1 | 9/2009 | Williams et al. | |
| 2010/0126617 A1 | 5/2010 | Stroempl et al. | |
| 2011/0088409 A1 | 4/2011 | Carlisle | |
| 2011/0113787 A1 | 5/2011 | Milosavljevic | |
| 2011/0247590 A1 | 10/2011 | Donovan | |
| 2012/0085468 A1 | 4/2012 | Walker | |
| 2012/0125008 A1 | 5/2012 | Prociw et al. | |
| 2013/0000323 A1 | 1/2013 | Kupratis | |
| 2013/0040255 A1 | 2/2013 | Shi et al. | |
| 2013/0143171 A1 | 6/2013 | Soda et al. | |
| 2014/0060063 A1 | 3/2014 | Boardman et al. | |
| 2014/0150401 A1 | 6/2014 | Venter | |
| 2014/0216384 A1 | 8/2014 | Tanaka et al. | |
| 2014/0366505 A1 | 12/2014 | Prociw et al. | |
| 2014/0366542 A1 | 12/2014 | Teets | |
| 2014/0366551 A1 * | 12/2014 | Prociw | F23R 3/20 60/776 |
| 2015/0036781 A1 | 2/2015 | Youssef | |
| 2015/0040575 A1 | 2/2015 | Martinez Fabre et al. | |
| 2015/0260406 A1 * | 9/2015 | Carrere | F02C 3/14 60/787 |
| 2015/0275755 A1 | 10/2015 | Ogata et al. | |
| 2015/0275769 A1 | 10/2015 | Foutch et al. | |
| 2015/0308351 A1 | 10/2015 | Sheridan | |
| 2015/0345426 A1 | 12/2015 | Houston et al. | |
| 2015/0345788 A1 | 12/2015 | Miyata et al. | |
| 2015/0354517 A1 | 12/2015 | Mansour et al. | |
| 2016/0003150 A1 | 1/2016 | Dicintio et al. | |
| 2016/0010559 A1 | 1/2016 | Hoke et al. | |
| 2016/0047318 A1 | 2/2016 | Dam et al. | |
| 2016/0084169 A1 | 3/2016 | Stuttaford et al. | |
| 2016/0169110 A1 | 6/2016 | Myers et al. | |
| 2016/0230993 A1 | 8/2016 | Dai et al. | |
| 2017/0138266 A1 | 5/2017 | Caples | |
| 2017/0145852 A1 | 5/2017 | Mccune et al. | |
| 2017/0284298 A1 | 10/2017 | Suciu et al. | |
| 2017/0350590 A1 | 12/2017 | Choudhri et al. | |
| 2017/0356656 A1 | 12/2017 | Ogata et al. | |
| 2018/0003388 A1 | 1/2018 | Park | |
| 2018/0010795 A1 | 1/2018 | Nath et al. | |
| 2018/0051710 A1 | 2/2018 | Takamura et al. | |
| 2018/0058224 A1 | 3/2018 | Jennings et al. | |
| 2018/0058331 A1 | 3/2018 | Barton et al. | |
| 2018/0058404 A1 | 3/2018 | Tibbs | |
| 2018/0100437 A1 | 4/2018 | Dicintio et al. | |
| 2018/0134407 A1 | 5/2018 | Elbibary et al. | |
| 2018/0154446 A1 | 6/2018 | Brown et al. | |
| 2018/0170575 A1 | 6/2018 | Ziarno | |
| 2018/0172271 A1 | 6/2018 | Moniz et al. | |
| 2018/0179896 A1 | 6/2018 | Pal et al. | |
| 2018/0179956 A1 | 6/2018 | Wertz | |
| 2018/0283692 A1 | 10/2018 | Ryon et al. | |
| 2018/0356095 A1 | 12/2018 | Patel et al. | |
| 2018/0363555 A1 | 12/2018 | Zelina et al. | |
| 2019/0010872 A1 | 1/2019 | Dam et al. | |
| 2019/0024897 A1 | 1/2019 | Prociw et al. | |
| 2019/0032561 A1 | 1/2019 | Stoia et al. | |
| 2019/0178497 A1 | 6/2019 | Jones et al. | |
| 2019/0249877 A1 | 8/2019 | Fryer | |
| 2020/0080530 A1 | 3/2020 | Freer et al. | |
| 2020/0088409 A1 | 3/2020 | Greenfield et al. | |
| 2020/0191059 A1 | 6/2020 | Ryon et al. | |
| 2020/0309378 A1 | 10/2020 | Dam et al. | |
| 2020/0348024 A1 | 11/2020 | Hicks | |
| 2021/0215100 A1 | 7/2021 | Head et al. | |
| 2022/0007488 A1 | 1/2022 | Bai et al. | |

FOREIGN PATENT DOCUMENTS

| | | |
|---|---|---|
| EP | 2189720 A1 | 5/2010 |
| EP | 3128166 A1 | 2/2017 |
| EP | 2677240 B1 | 4/2020 |
| FR | 970988 A | 1/1951 |
| FR | 1218296 A | 5/1960 |
| GB | 693846 A | 7/1953 |
| GB | 791990 A | 3/1958 |
| GB | 819141 A | 8/1959 |

(56) References Cited

FOREIGN PATENT DOCUMENTS

| | | | |
|---|---|---|---|
| GB | 859184 | A | 1/1961 |
| JP | 2015021715 | A | 2/2015 |
| KR | 101279722 | B1 | 6/2013 |

OTHER PUBLICATIONS

Extended European Search Report for EP Application No. 21214883.7, dated May 13, 2022, p. 10.
Extended European Search Report for EP Application No. 21201782.6, dated Mar. 28, 2022, 10 pages.
Extended European Search Report for EP Application No. 21205035.5, dated Mar. 28, 2022, 9 pages.
Extended European Search Report for EP Application No. 21214138.6, dated Apr. 25, 2022, 7 pages.
Extended European Search Report for EP Application No. 21212869.8, dated Apr. 28, 2022, p. 7.
Extended European Search Report for EP Application No. 21213899.4, dated May 6, 2022, 8 pages.
Extended European Search Report for EP Application No. 21214511 4, dated Apr. 29, 2022, 8 pages.
Extended European Search Report for EP Application No. 21214798.7, dated May 11, 2022, 8 pages.
Extended European Search Report for EP Application No. 21214894.4, dated May 3, 2022, 9 pages.
Extended European Search Report for EP Application No. 21205393.8, dated Mar. 17, 2022, 8 pages.
"Metal Seal Design Guide—High Performance Engineered Seals and Sealing Systems", from Parker Hannifin Corporation Composite Sealing Systems Division, 2016, 106 pages.
Database WPI—2017 Clarivate Analytics, Week 201919, Thomson Scientific, London GB; an 2019-17673X XP002806356, 2 pages.
Extended European Search Report for EP Application No. 21215655.8, dated May 2, 2022, 8 pages.
Extended European Search Report for EP Application No. 21215709.3, dated May 12, 2022, 9 pages.
Extended European Search Report for EP Application No. 21216163.2, dated May 16, 2022, 8 pages.
Extended European Search Report for EP Application No. 21209057.5, dated Jul. 19, 2022, 8 pages.

\* cited by examiner

TORCH IGNITER COOLING SYSTEM

BACKGROUND

The present disclosure relates to gas turbine engines and, more particularly, to cooling arrangements suitable for torch igniters used in the combustor section of a gas turbine engine.

Torch igniters can be used in lieu of spark igniters to provide an ignition source for combustors located in gas turbine engines. Torch igniters provide a flame as an ignition source for a combustor rather than the electric current provided by spark igniters. Consequently, torch igniters can provide a larger target for fuel injectors used in a combustor, permitting the use of a greater range of fuel injector designs. However, due to their location in a gas turbine engine, torch igniters can experience temperatures exceeding 3000-4000° F. These high temperature conditions can exceed the thermal limits of materials used in torch igniter construction, negatively impacting the durability of the torch igniter device.

SUMMARY

In one embodiment, the present disclosure provides a torch igniter for a combustor of a gas turbine engine comprises a combustion chamber oriented about an axis, a cap defining an axially upstream end of the combustion chamber and oriented about the axis, a tip defining an axially downstream end of the combustion chamber, a structural wall coaxial with and surrounding the igniter wall, an outlet passage defined by the igniter wall within the tip, and a cooling system. The upstream and downstream ends define a flow direction through the combustion chamber, the cap is configured to receive a fuel injector and a glow plug, and the outlet passage is fluidly connected to the combustion chamber. The cooling system comprises an air inlet formed within the structural wall, a first flow path disposed between the structural wall and the igniter wall, and an aperture extending through the igniter wall transverse to the flow direction. The air inlet is configured to intake a flow of air from a compressor section of the gas turbine engine, the first flow path extends from the inlet to the cap and is configured to receive a first portion of the air taken in by the inlet, and the aperture fluidly connects the second flow path to the combustion chamber.

In another embodiment, the present disclosure provides a method of cooling a torch igniter in a gas turbine engine that includes intaking a flow of air, flowing a first portion of the flow through a first flow path, and flowing the first portion of the air through an aperture. The air is taken in at an air inlet formed in a structural wall of an igniter. The structural wall extends coaxially with and surrounds an igniter wall. The igniter wall defines a combustion chamber within the torch igniter. The first flow path is disposed between the structural wall and the igniter wall and extends from the inlet toward a cap defining an upstream end of the torch igniter. The aperture directly fluidly connects the first flow path to the combustion chamber.

Figure 1:
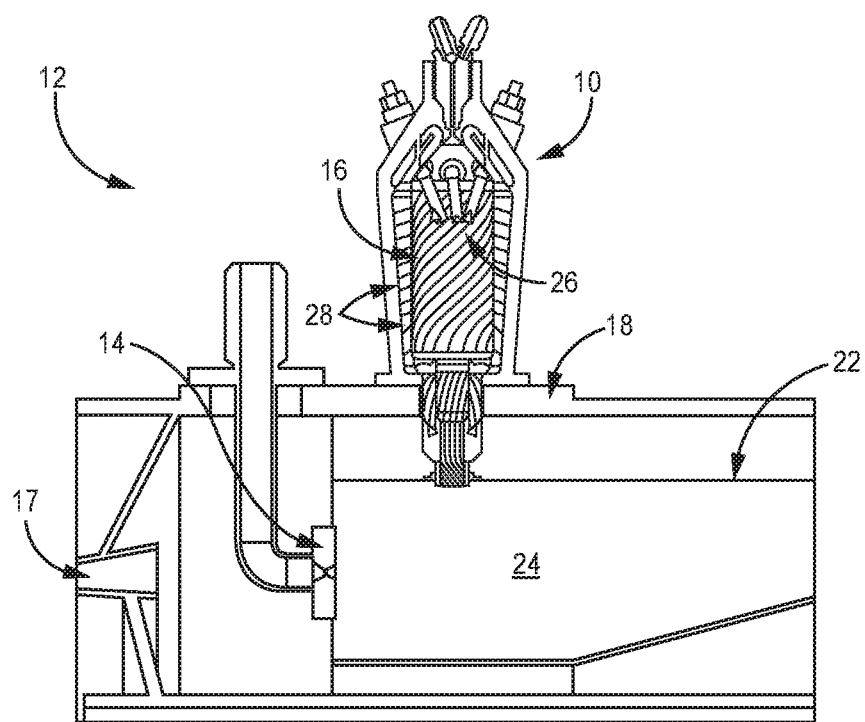
FIG. 1 is a cross-sectional view of an example of torch igniter within the combustion section of a gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The present invention includes structures and methods for cooling torch igniters within the combustor section of a gas turbine engine. These structures and methods cool a torch igniter with high-pressure air, such as air exiting the high-pressure section of a gas turbine engine. This air is subsequently fed into a combustion chamber of the torch igniter for combustion within the torch igniter, preventing potential downstream thermal stress that could result from allowing the cooling air to bypass the combustor section. The cooling schemes of the present invention allow a torch igniter to be constructed from high-temperature metallic components and can be produced via additive manufacturing.

FIG. 1 is a cross-sectional view of torch igniter 10 disposed within combustor section 12 of a gas turbine engine. In the illustrated embodiment, torch igniter 10 is mounted orthogonally to the direction of a fuel spray from fuel nozzle 14, such that combustion chamber 16 of torch igniter 10 is located outside of high-pressure case 18 and the tip of torch igniter 10 extends through high-pressure case 18 and is mounted through combustor liner 22 of combustor 24. The example of torch igniter 10 in FIG. 1 is shown as having glow plug 26. Glow plug 26 is a resistive heater used to ignite fuel and create combustion within torch igniter 10, creating a flame within combustion chamber 16. Air flows into high-pressure case 18 from a compressor section of the gas turbine engine via inlet 17. Torch igniter 10 intakes high-pressure air from the inside of high-pressure case 18 via an inlet disposed in the tip of torch igniter 10. The high-pressure air is channeled through cooling channel 28 to cool an igniter wall of combustion chamber 16 before it is channeled into combustion chamber 16 to feed combustion within torch igniter 10. Combustion chamber 16 is in fluid communication with an internal volume of combustor 24 via an outlet within the tip, allowing the flame created within combustion chamber 16 to reach the interior of combustor 24 and thereby ignite fuel within combustor 24.

Figure 2A:
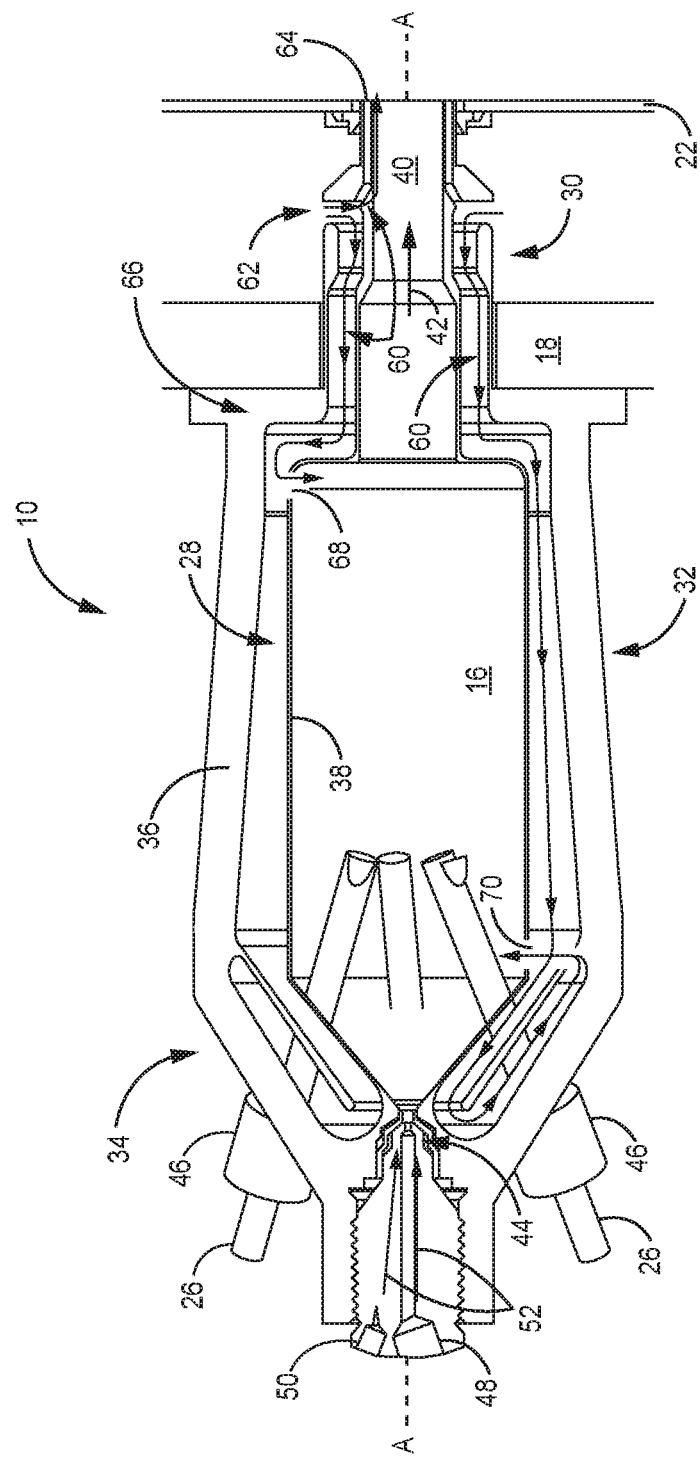
FIG. 2A is cross-sectional view of an example of a torch igniter illustrating an arrangement of cooling flow paths.

FIG. 2A is a cross-sectional view of torch igniter 10. Torch igniter 10 is composed of tip section 30, combustion section 32, and cap section 34. Cooling channel 28 is formed in the wall of torch igniter 10 in a generally annular space extending between structural wall 36 and igniter wall 38. Air flowing through cooling channel 28 is able to cool igniter wall 38, thereby also protecting structural wall 36 from thermal stresses due to combustion occurring inside combustion chamber 16. Igniter wall 38 surrounds the internal volume of torch igniter 10, which includes combustion chamber 16 and outlet passage 40, such that igniter wall 38 runs from the end of tip section 30 to cap section 34. Igniter wall 38 may be annular where it surrounds combustion chamber 16 and outlet passage 40, and may be dome- or cone-shaped where it extends adjacent to cap section 34. Further, igniter wall 38 has a larger diameter where it surrounds combustion chamber 16 than where it surrounds outlet passage 40. In the depicted example, igniter wall 38 causes outlet passage 40 to narrow as it extends toward combustor liner 22.

In the illustrated embodiment, torch igniter 10 is arranged such that tip section 30, combustion section 32, and cap section 34 are all oriented about axis A-A. Arrow 42 shows the general direction of flow for fluids from combustion chamber 16 through outlet passage 40. Thus, torch igniter 10 has upstream and downstream ends oriented along axis A-A and according to the direction of arrow 42. Combustion chamber 16 and outlet passage 40 are fluidly connected such that gases are able to flow from combustion chamber 16 toward tip section 30 and to outlet passage 40. Gases are able to exit torch igniter 10 and enter an internal volume of the combustor via outlet passage 40. To this extent, cap section 34 is disposed at the upstream end of torch igniter 10 and tip section 30 is disposed at the downstream end of torch igniter 10. It should be understood, however, that tip section 30 may be disposed at any suitable location on the downstream end of torch igniter 10, and oriented in any direction suitable to direct flame for engine ignition, including locations/orientations not coaxial with axis A-A.

During operation, combustion occurs within combustion chamber 16. Hot gases exit torch igniter 10 into a combustor of a gas turbine engine via outlet passage 40. Generally, the portion of torch igniter 10 internal to structural wall 36 is at a higher pressure than the area external to structural wall 36 during operation. Structural wall 36 functions as a pressure vessel and is generally strong enough that it does not deform or leak gases, such as combustion gases or cooling air, under this operational pressure differential. However, the rigidity of structural wall 36 can be negatively affected by the high temperatures of combustion gases produced in combustion chamber 16. Igniter wall 38 acts as a liner to protect the material integrity of structural wall 36 from the heat of combustion in combustion chamber 16. Advantageously, cooling of igniter wall 38 via air circulating through channel 28 allows torch igniter 10 to be constructed monolithically from a metallic material, including metallic materials readily fabricable via additive manufacturing. Likewise, additive manufacturing techniques enable the construction of complex cooling structures within channel 28, such as cooling fins, to improve cooling of igniter wall 38.

Torch igniter 10 causes combustion within combustion chamber 16 by using injector 44 to inject a fuel-air mixture onto the surface of glow plug 26. Glow plug 26 extends through cap section 34, such that it has an internal end and an external end. Further, glow plug 26 can be resistively heated such that it is able to ignite the fuel-air mixture injected by injector 44. Injector 44 generally injects the fuel-air mixture in a conical volume centered on axis A that impinges on the internal end of glow plug 26. To improve ignition of fuel injected by fuel injector 44, torch igniter 10 can be configured with multiple glow plugs 26 at multiple locations within combustion chamber 16. Further, if the injection pattern of injector 44 is distorted by coking, for example, using multiple glow plugs 26 at multiple locations within combustion chamber 16 can improve the likelihood that the injected fuel impinges on at least one glow plug 26. For example, torch igniter 10 can in some embodiments be equipped with six glow plugs 26 distributed circumferentially, and in some cases symmetrically, about cap section 34.

Generally, glow plug 26 is mounted to cap section 34 via glow plug housing 46. Glow plug housing 46 extends through structural wall 36 and igniter wall 38 of torch igniter 10 and thereby allows glow plug 26 to extend into combustion chamber 16. Glow plug 26 may be removably attached to glow plug housing 46, such as by a screw attachment, or may be non-removably attached to glow plug housing 46. In some examples where glow plug 26 is removably attached, it is brazed to a metal sheath. The sheath can have, for example, screw-threading that allows glow plug 26 to be attached via screw attachment.

Glow plug 26 is also connected to a power source capable of delivering electric current to the external end of glow plug 26, allowing for the electrically-resistive heating of glow plug 26. In examples where torch igniter 10 contains multiple glow plugs 26, they may be connected to more than one power source or may be connected in a series, parallel, or combination arrangement to a single power source. Generally, glow plug 26 is formed of a material capable of being non-destructively resistively heated. For example, glow plug 26 can be formed of a ceramic material such as silicon nitride.

Injector 44 is fed the fuel-air mixture from air source 48 and fuel source 50. Air from air source 48 and fuel from fuel source 50 travel according to arrows 52 toward the nozzle of injector 44. An annulus near the nozzle of injector 44 allows for the controlled mixing of air and fuel. This configuration allows injector 44 both to meter fuel usage and to atomize the fuel that is injected by injector 44. Injector 44 is shown as removably connected via screw threads, but it should be understood that any appropriate connector may be used to removably connect injector 44 and further that injector 44 may be irremovably connected to torch igniter 10. Where injector 44 is removably connected, it may be inserted through an aperture in cap section 34.

Arrows 60 indicate the general flow path of cooling air through cooling channel 28. Torch igniter 10 intakes high-pressure air from inside high-pressure case 18 via inlet 62. As shown by arrows 60, the air entering air inlet 62 first flows radially inward toward igniter wall 38. The air then splits into two main flow paths. One flow path flows air toward the end of tip section 30 and through outlet 64, providing cooling air to the entirety of igniter wall 38 within tip section 30. Outlet 64 is fluidly connected to combustor 24 and provides air flowing toward combustor liner 22 in tip section 30 to the interior of combustor 24. The other flow path flows air toward cap section 34 and elbow region 66.

Elbow region 66 is formed by the difference in the diameter of igniter wall 38 where it surrounds combustion chamber 16 and outlet passage 40. In the depicted example, igniter wall 38 turns approximately 90° at elbow region 66. Consequently, channel 28 extends generally radially through elbow region 66. However, it should be understood that igniter wall 38 can bend at any angle suitable to constrain or direct hot combustion gases flowing through combustion chamber 16 towards outlet passage 64, including non-90° angles.

Metering hole 68 is disposed downstream of the internal ends of glow plugs 26 in elbow region 66 and functions to reduce or meter the flow of air flowing through channel 28 to air swirl hole 70 and thereby optimize ignition conditions near fuel injector 44. Air leaving metering hole 68 also functions to facilitate the combustion of any residual fuel leaving combustion chamber 16 and entering outlet passage 40, preventing introduction of unignited fuel in combustor 24. Generally, combustion gases flowing through combustion chamber 16 tend to be hotter at elbow region 66 than in other locations throughout the torch igniter. Further, the narrowing of igniter wall 38 at elbow region 66 causes acceleration of combustion gases through outlet passage 40, resulting in creased convection of hot combustion gases near elbow region 66. This causes greater heat transfer into igniter wall 38 at elbow region 66 than other regions of igniter wall 38. When metering hole 68 is disposed adjacent to the portion of igniter wall 38 in elbow region 66, the air diverted through metering hole 68 can cool gases at elbow region 66 to protect igniter wall 38, thereby increasing the longevity of igniter wall 38.

The portion of air that is not diverted through metering hole 68 continues flowing to the section of channel 28 embedded in cap section 34 and further to air swirl hole 70. Air swirl hole 70 is disposed at an upstream location of torch igniter 10 and fluidly connects channel 28 to combustion chamber 16. In the depicted example, channel 28 turns back approximately 180° and forms a dual-layer structure in cap section 34 with the outer layer connected to air swirl hole 70, which allows channel 28 to cool the entirety of igniter wall 38 along the inside of cap section 34 while also allowing for air swirl hole 70 to be positioned along igniter wall 38 at a location outside of cap section 34 and to be oriented transversely to flow direction 42 or the inner portion of channel 28. To connect channel 28 to combustion chamber 16 from the exterior portion of cap section 34, air swirl hole 70 extends through and crosses the inner portion of channel 28. Generally, the crossing portion of channel 28 is not fluidly connected to the inner portion of channel 28. Air entering combustion chamber 16 through air swirl hole 70 is used with the air-fuel mixture injected by injector 44 for combustion within combustion chamber 16. In the depicted example, air swirl hole 70 is positioned upstream of the interior end of glow plug 26 to optimize mixing of air entering through air swirl hole 70 with combustion gases inside combustion chamber 16. Air exiting air swirl hole 70 can also be used to prevent buildup of fuel along igniter wall 38 and further to create recirculation zones within combustion chamber 16 suitable for maintaining a self-sustaining flame. It should be understood, however, that air swirl hole 70 may be positioned at any suitable location along combustion chamber 16.

Thus, the configuration of cooling channel 28 shown in FIG. 2A allows air taken in through inlet 62 to be used to cool the entirety of igniter wall 38 from cap section 34 to tip section 30. The configuration further allows air taken in at air inlet 62 to exit channel 28 through outlet 64, metering hole 68, or air swirl hole 70 and ultimately into the interior of combustor 24. Advantageously, this configuration prevents downstream thermal stress that could result from allowing the cooling air to bypass the combustor section. Further, this configuration also advantageously allows for regenerative heating of air entering combustion chamber 16 by transferring heat from combustion chamber 16 or other sources to air flowing through channel 28 before using it for combustion in combustion chamber 16. Using heated air for combustion in combustion chamber 16 improve combustion efficiency.

In the depicted embodiment, air swirl hole 70 is positioned upstream of the interior end of glow plugs 26. The depicted position and previously described transverse orientation of air swirl hole 70 allows air exiting air swirl hole 70 to create a recirculation zone within combustion chamber 16. More specifically, the transverse entry of air into combustion chamber 16 creates a low-pressure zone along the centerline of axis A-A and allows for upstream flow of combustion gases along the perimeter of combustion chamber 16. Upstream-flowing combustion gases are heated from the combustion reaction, allowing them to evaporate fuel injected by fuel injector 44 and thereby perpetuate combustion. This allows torch igniter 10 to operate with a self-sustaining flame that does not require continuous resistive heating of glow plugs 26. Rather, in examples where torch igniter 10 can create a self-sustaining flame, glow plugs 26 can be resistively heated only to create an initial ignition of fuel within combustion chamber 16 and then their resistive heating can be stopped. Glow plugs 26 can then remain inactive during continuous operation, with additional air supplied by air swirl hole 70 and fuel supplied by injector 44 perpetuating combustion inside combustion chamber 16.

Generally, torch igniter 10 operates continuously during the entire operation time of the gas turbine engine in which it is located. Continuous operation allows torch igniter 10 to easily facilitate altitude re-lights of combustor 24 by acting as a pilot light for fuel ignition within combustor 24. Though torch igniter 10 generally operates continuously, torch igniter 10 may experience an unexpected blow-out at high altitudes. While torch igniter 10 is not operating, it is not able to relight combustor 24 in the event of a subsequent or simultaneous blow-out of combustor 24. Advantageously, combustion chamber 16 is sufficiently large that combustion can occur within combustion chamber 16 when air entering high-pressure case 18 from inlet 17 is at a relatively low-pressure, such as at high altitudes while combustor 24 is not lit. Thus, even at high altitudes, torch igniter 10 can be re-lit and thereby re-light combustor 24 after blow-outs of torch igniter 10 and combustor 24.

Advantageously, torch igniter 10 can be operated with minimal fuel consumption during continuous operation. Limiting the fuel fed to combustion within torch igniter 10 can prevent a hot streak of combustion gases from entering combustor 24 and damaging combustor liner 22. Generally, inlet 62 intakes air at a variable rate that depends on engine pressurization and fuel injector 44 injects fuel at a rate that varies proportionally with the rate that air is taken in by inlet 62. For example, during a pre-takeoff startup of torch igniter 10, inlet 62 may intake air at a rate of approximately 10 lbs. per hour. However, during takeoff conditions or continuous operation, inlet 62 can intake air at a rate of approximately 400 lbs. per hour. The amount of fuel injected by fuel injector 44 is selected to provide an appropriate amount of fuel to form a stable air/fuel mixture in combustion chamber 16. One such arrangement allows fuel injector 44 to provide enough fuel such that the ratio of fuel to air in combustion chamber 16 is 10:1 at any point during operation. For example, fuel injector 44 may provide 1 lb. of fuel per hour during a pre-takeoff startup and may provide 40 lbs. per hour of fuel during takeoff or continuous operation. However, when air taken in through inlet 62 is sufficiently hot, less fuel may be required for continuous operation of torch igniter 10. Under these conditions, torch igniter 10 may be operated with an air to fuel ratio of 30:1 (approximately 15 lbs. of fuel per hour), further minimizing the amount of fuel consumed by torch igniter 10.

Figure 2B:
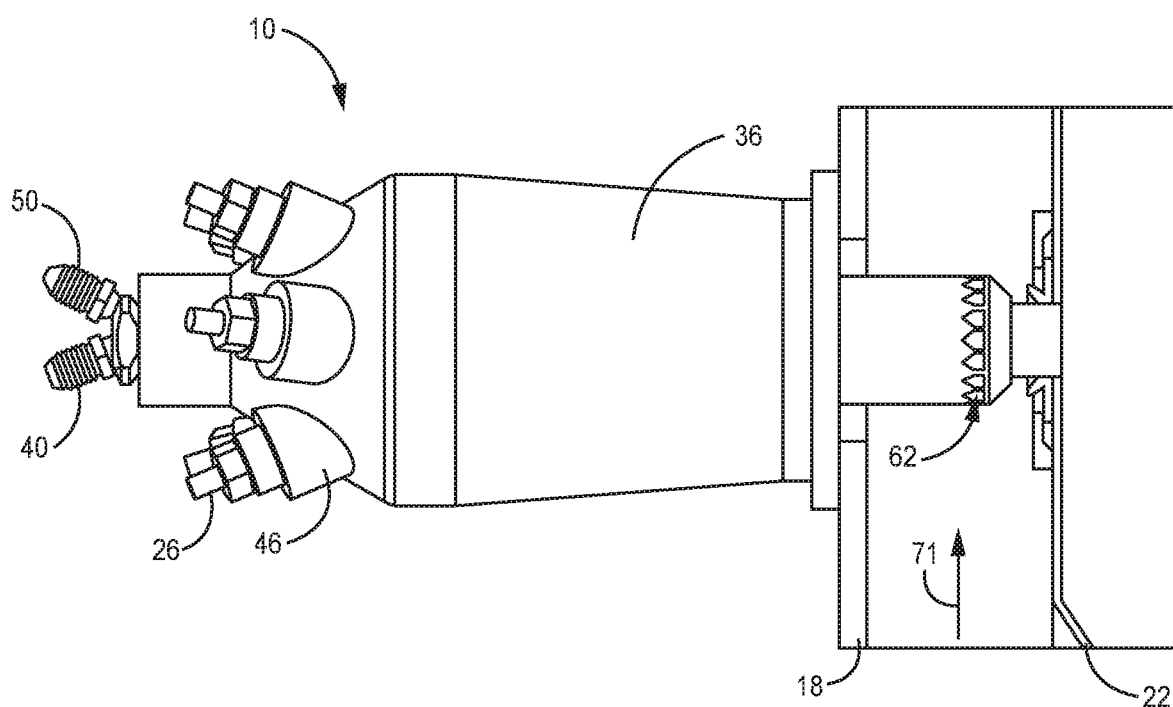
FIG. 2B is a perspective view of an example of a torch igniter showing an air inlet in the exterior of the torch igniter.

FIG. 2B is a perspective view of torch igniter 10 showing the exterior of inlet 62. Generally, air taken in by inlet 62 flows through high-pressure case 18 in a direction orthogonal to axis A-A. In the embodiment depicted in FIG. 2B, the exterior of inlet 62 has a gabled pentagonal shape. The depicted gabled inlet approximates a substantially rectangular shape as closely as possible within fabrication constraints, i.e. with regard to overhang angle for examples of torch igniter 10 that are additively manufactured, especially those examples where successive layers are added along axis A-A starting at tip section 30 and ending at cap section 34. Alternatively, support-free additive manufacturing techniques, such as binder jetting, can be used to fabricate an inlet lacking the gabled portion of inlet 62. Further, in the depicted example, torch igniter 10 contains a plurality of inlets disposed orthogonally to the flow of air through high-pressure case 18 (depicted by arrow 71) and arranged in an annular pattern. However, it should be understood that the exterior of inlet 62 can take any appropriate shape for intaking air to torch igniter 10 and further that torch igniter 10 may have a plurality of inlets in any suitable arrangement.

Figure 3A:
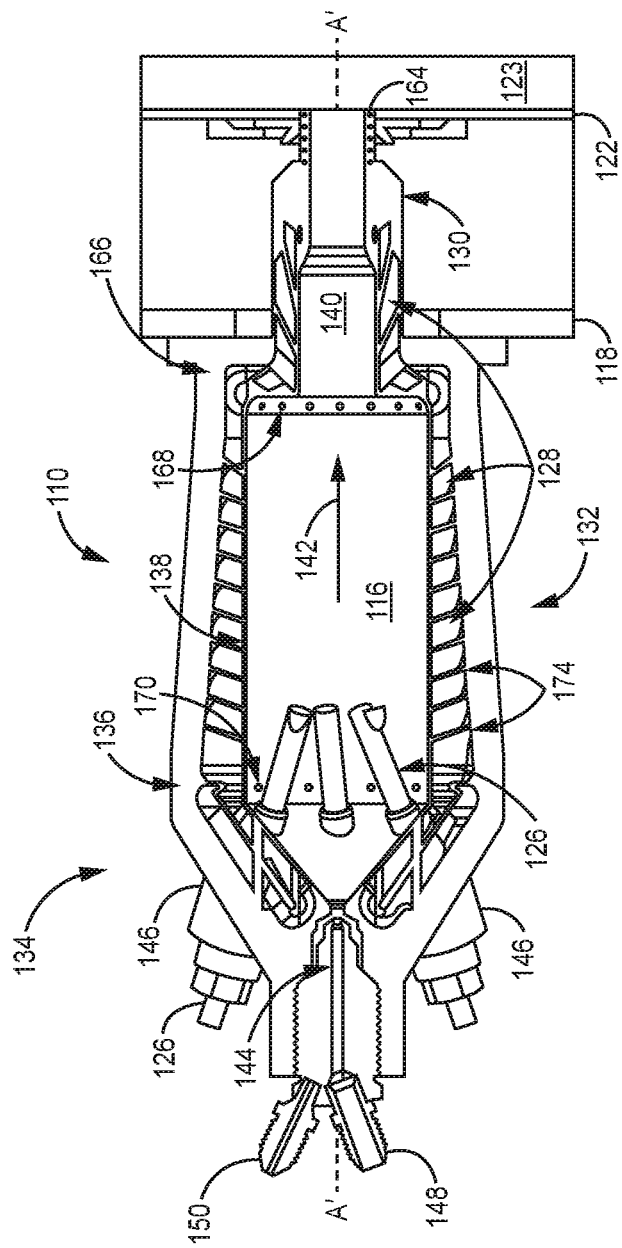
FIG. 3A is a cross-sectional view of an example of a cooling arrangement for a torch igniter.

FIG. 3A is a cross-sectional view of torch igniter 110, which is arranged similarly to torch igniter 10. Torch igniter 110 is mounted to high-pressure case 118 and combustor liner 122, extends long axis A'-A', and includes combustion chamber 116, glow plugs 126, channels 128, tip section 130, combustion section 132, and cap section 134. Channels 128 are disposed in and form a flow path through a space between structural wall 136 and igniter wall 138. Igniter wall 138 surrounds and defines combustion chamber 116 and outlet passage 140. Arrow 142 indicates the direction of flow through the interior region of torch igniter 110. Fuel injector 144 injects fuel on to glow plugs 126, which are mounted through cap section 134 via glow plug housing 146. Fuel injector 144 utilizes air source 148 and fuel injector 150.

Air from within the high-pressure turbine case enters torch igniter 110 via inlets in tip section 130 (not shown) and along substantially similar flow paths as those present in torch igniter 10. Specifically, a portion of air from an inlet is diverted and travels through helical outlets 164 to cool the end of tip section 130. Air exits helical outlets 164 through combustor liner 122 into the interior of main combustor 123. The portion of air that is not diverted through helical outlets 164 travels axially through channels 128. Channels 128 have axially-extending helical sections surrounding igniter wall 138 in tip section 130 and combustion section 132 and a radially-extending section in elbow region 166. In the depicted example, channels 128 embedded within cap section 134 are not helical. A portion of air traveling through channels 128 is diverted through metering holes 168 downstream of the internal end of glow plugs 126 and the remainder of air traveling through channels 128 enters combustion chamber 116 through air swirl holes 170, which are disposed upstream of the internal end of glow plugs 126. Torch igniter 110 is capable of operating with a self-sustaining flame, as described previously with respect to torch igniter 10.

Figure 3B:
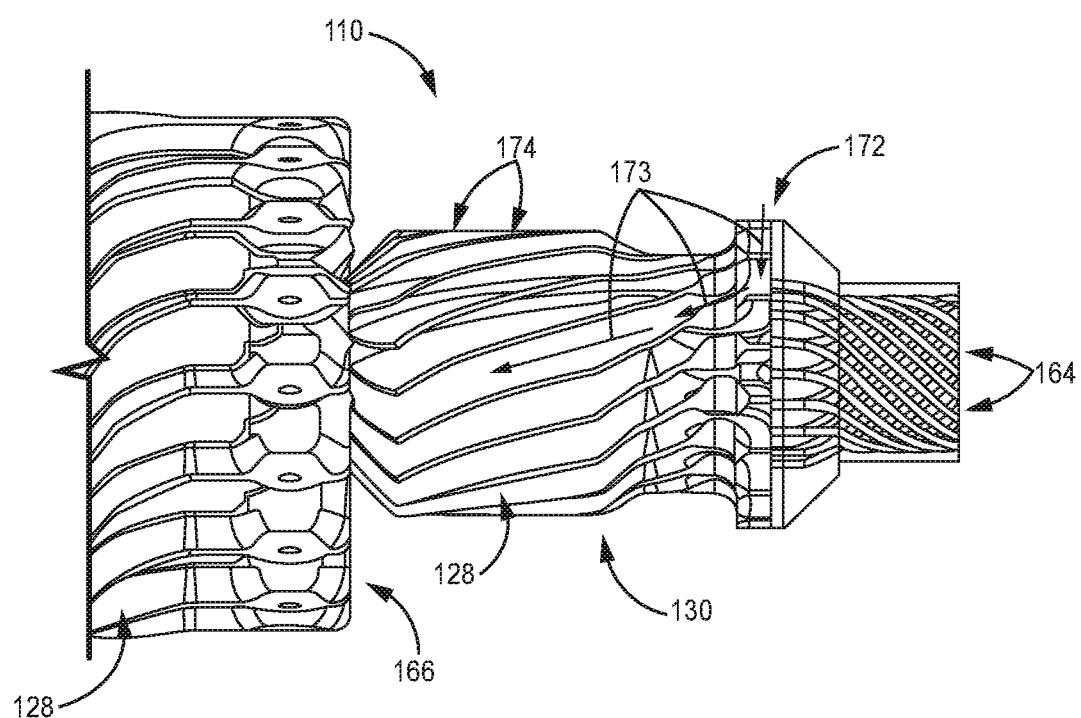
FIG. 3B is a cutaway view of an example of a cooling arrangement for an inlet region of a torch igniter.
Figure 3C:
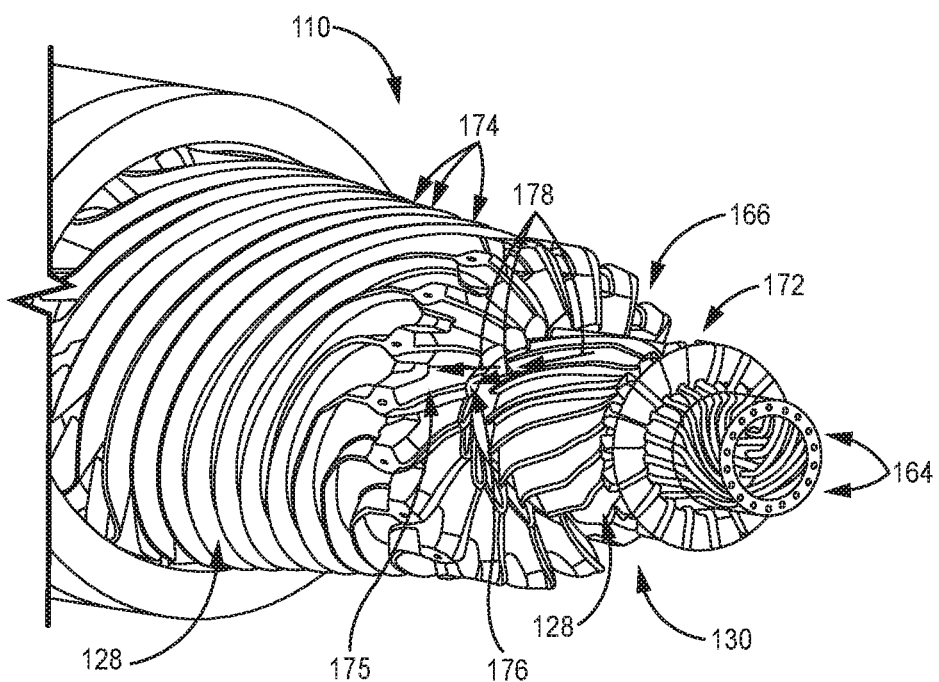
FIG. 3C is a cutaway view of an example of a cooling arrangement for a torch igniter showing a flow path through an elbow region of the torch igniter.
Figure 3D:
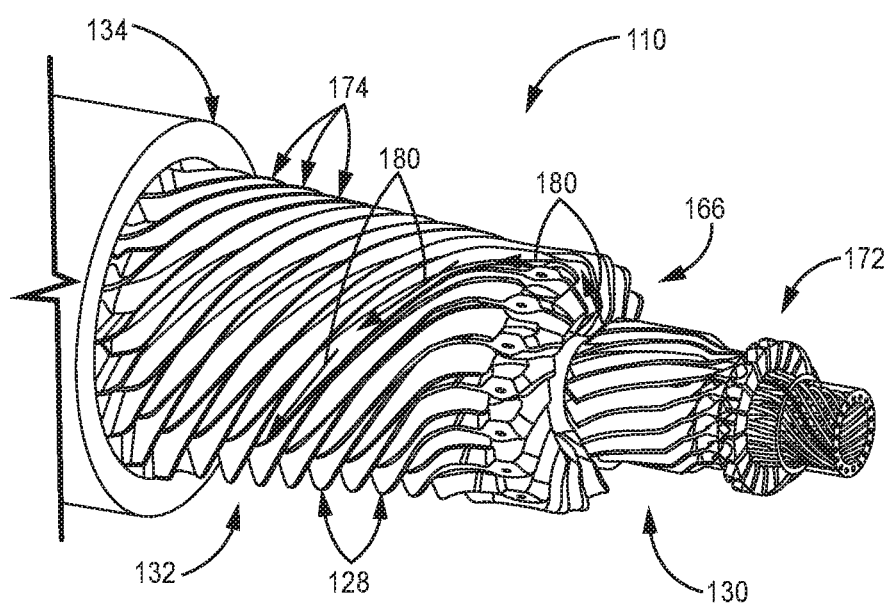
FIG. 3D is a cutaway view of an example of a cooling arrangement for a torch igniter showing the flow of air around the combustion chamber of the torch igniter.

FIGS. 3B-D are cutaway views of torch igniter 110. Inlets 172 have a gabled shape and feed a helical section of channels 128 in along flow path indicated by arrows 173. At elbow region 166, the helical sections of channels 128 are shaped discontinuous in portions, for example, to allow air to travel radially outward at elbow region 166. Further, the helical sections of channels 128 embedded in tip section 130 and combustion section 132 have fins 174 that extend radially from igniter wall 138 and to structural wall 136. In examples where torch igniter 110 is formed monolithically, fins 174 may connect to structural wall 136. Fins 174 are configured to absorb heat from igniter wall 138, increasing the surface area available for cooling igniter wall 138 with air flowing through channels 128. In examples where fins 174 connect to structural wall 136, they are able to channel a portion of the heat from igniter wall 138 to structural wall 136, allowing structural wall 136 to act as a cooling sink.

Elbow region 166 includes radial sections 175 and channels 176. Arrows 178 indicate the direction of airflow through elbow region 166. A portion of air leaving helical channels 128 in tip section 130 travels radially outward through radial sections 175 toward the helical section of channels 128 in combustion section 132. Another portion of air leaving helical channels 128 in tip section 130 is diverted through channels 176 and toward metering holes 168.

Air exiting elbow section 166 flows according to arrows 180. Specifically, air flowing through radial sections 175 toward cap section 134 turns to flow axially along combustion section 132. Channels 128 have a helical shape as they extend along combustion section 132.

Figure 3E:
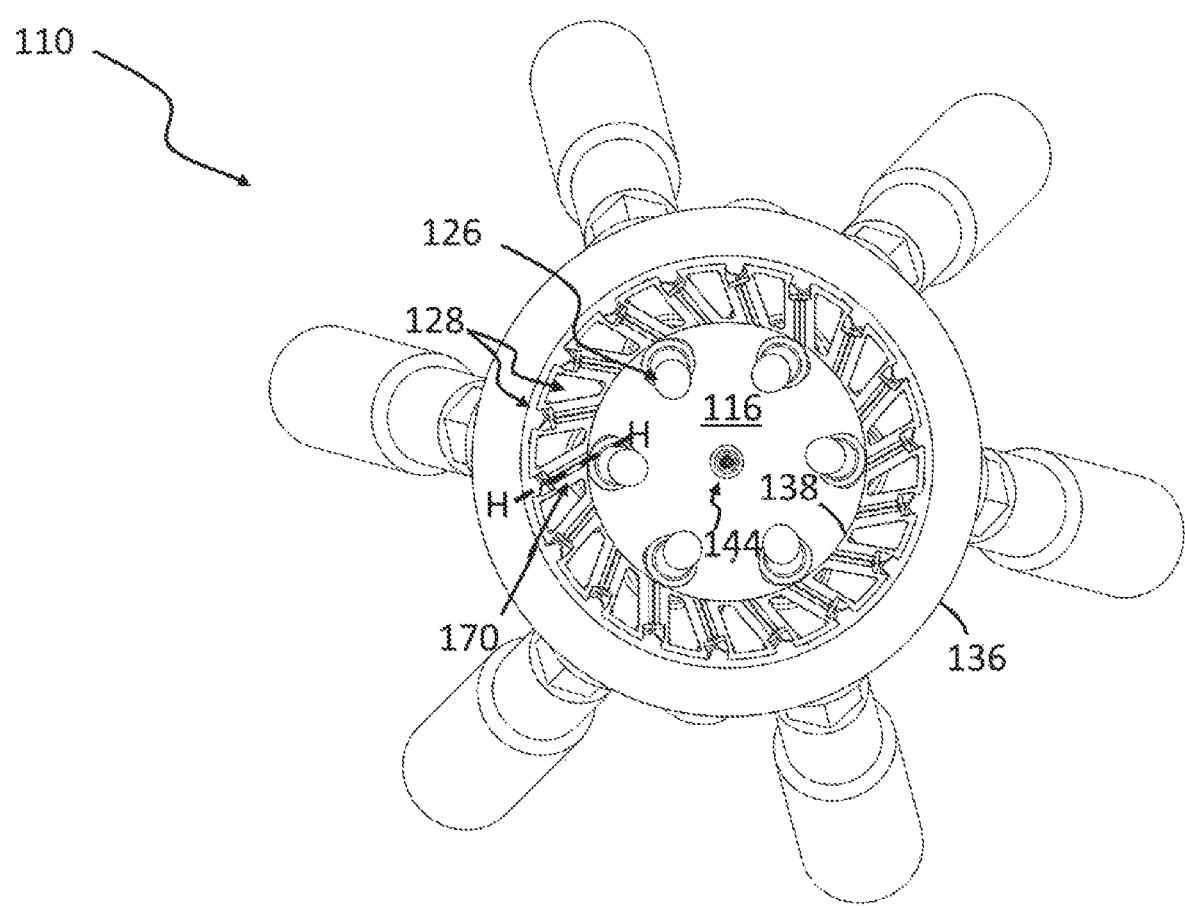
FIG. 3E is a cross-sectional view of the torch igniter shown in FIGS. 3A-D showing orientation of air swirl holes.
Figure 3F:
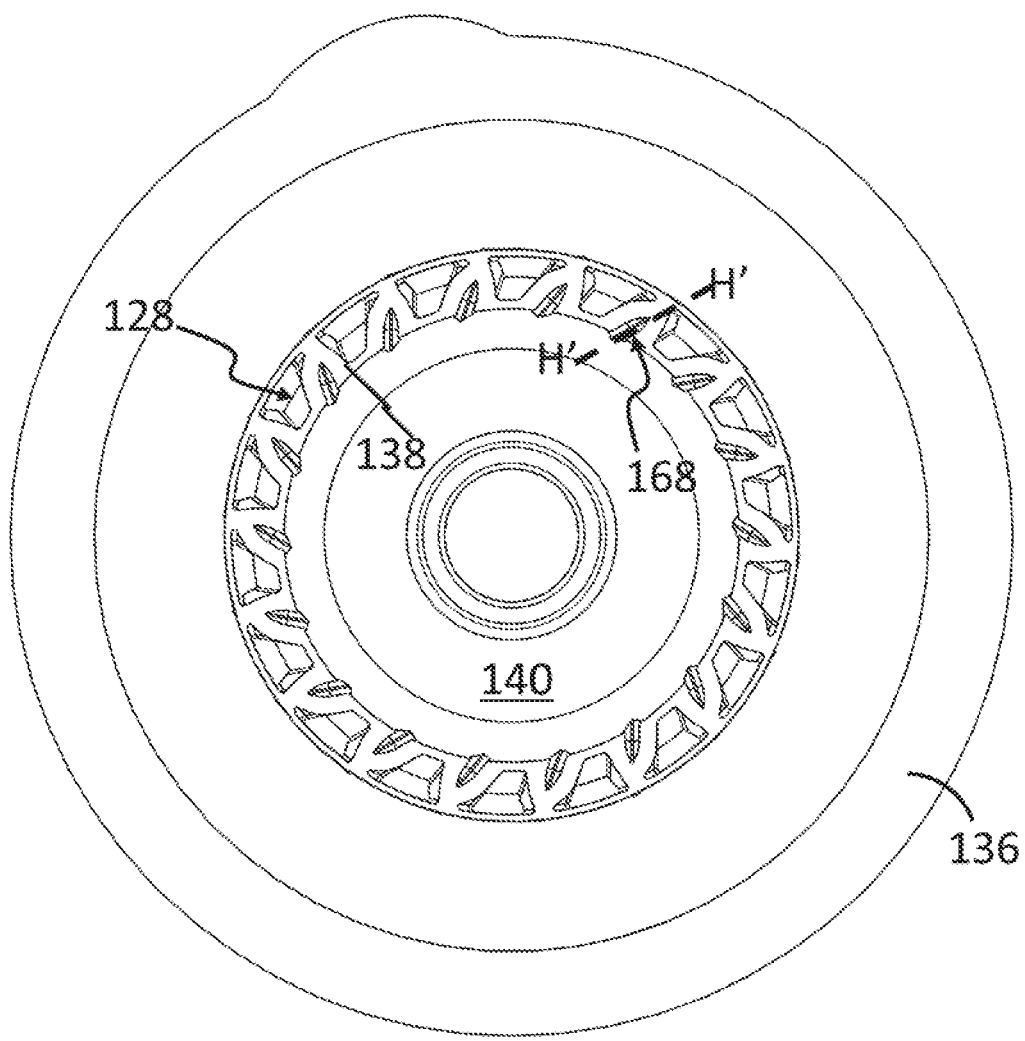
FIG. 3F is a cross-sectional view of the torch igniter shown in FIGS. 3A-D showing orientation of air metering holes.

FIGS. 3E-F show cross-sectional views of torch igniter 110 taken along axis A'-A' that illustrate a canted orientation of metering holes 168 and air swirl holes 170. Canting metering holes 168 or air swirl holes 170 with respect to the inner surface of igniter wall 138 allows metering holes 168 and air swirl holes 170 to act as swirl holes, imparting air exiting metering holes 168 and air swirl holes 170 with a swirl relative to axis A'-A' to improve uniformity of heat distribution in combustion chamber 116. The cross-sectional view shown in FIG. 3E is taken along axis A'-A' between metering holes 168 and air swirl holes 170. FIG. 3E shows the orientation of glow plugs 126, channels 128, fuel injector 144, and air swirl holes 170 relative to combustion chamber 116. Each air swirl hole 170 extends along a hole axis H-H, which is canted with respect to an inner surface of igniter wall 138. As used herein throughout, "canted" indicates that hole axes are angled with respect to a radial orientation of the cross-sectional plane. FIG. 3E also shows how air swirl holes 170 cross through the inner portion of channels 128 from the outer portion of channels 128 near cap section 134. The cross-sectional view shown in FIG. 3F is taken along axis A'-A' near elbow region 166. FIG. 3F shows the orientation of channels 128 and metering holes 168 relative to outlet passage 140. Each metering hole 168 extends along a hole axis H'-H', which is canted with respect to an inner surface of igniter wall 138. For simplicity, the connection between metering holes 168 and channels 128 is not shown in FIG. 3D, though it should be understood that channels 128 are fluidly connected to metering holes 168 as described previously.

Figure 4:
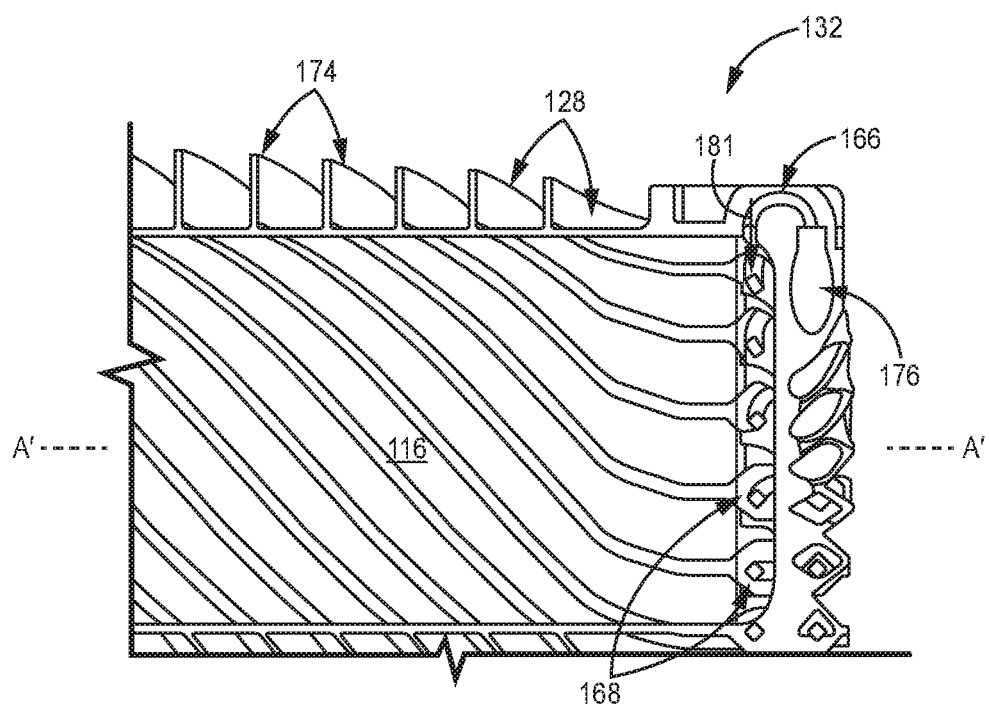
FIG. 4 is a cross-sectional view of an example of an air metering hole for a torch igniter cooling arrangement.

FIG. 4 is a cross-sectional view of torch igniter 110 showing the interior portion of metering holes 168. Igniter wall 138 is transparent in FIG. 4 to better illustrate the helical shapes of channels 128 and fins 174. Air flowing from channels 176 enters metering holes 168 within elbow region 166. Metering holes 168 have a curved shape and are shaped such that air exits them into combustion chamber 116 transversely to both the flow direction and axis A'-A', as indicated by arrow 181. Metering holes 168 can be canted with respect to the interior surface of igniter wall 138 such that metering holes 168 act as swirl holes, imparting air exiting metering holes 168 with a swirl relative to axis A'-A' to improve uniformity of heat distribution in combustion chamber 116. In the depicted embodiment, approximately 50% of air traveling through channels 128 is diverted to metering holes 168 through channels 176. However, it should be understood that the amount of air diverted to metering holes 168 can vary depending the percentage of airflow desired to enter combustion chamber 116 through air swirl holes 170.

Figure 5A:
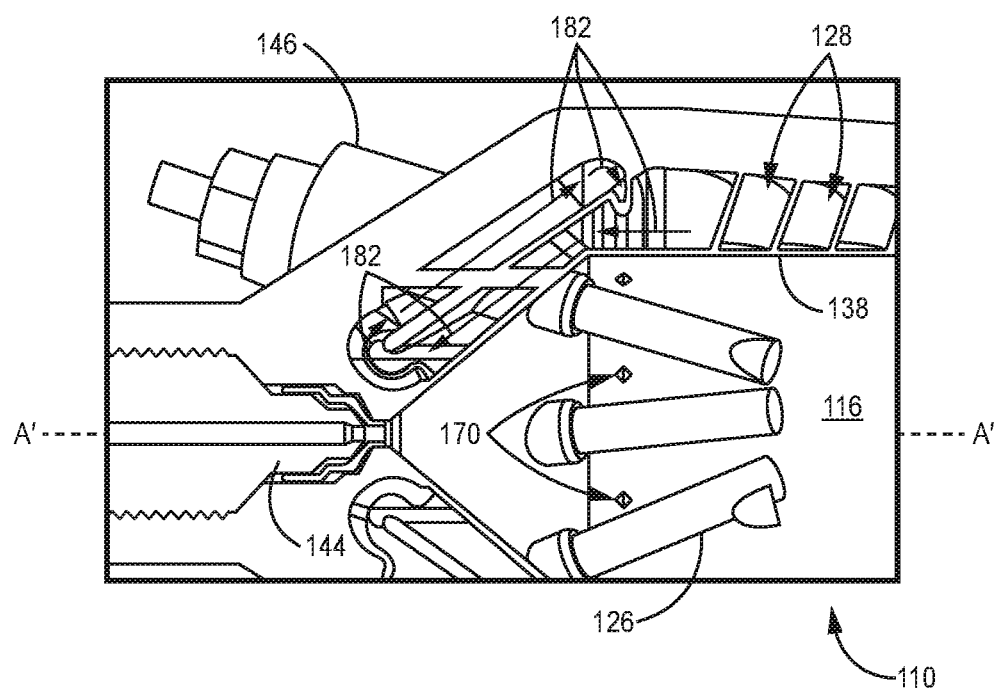
FIG. 5A is a cross-sectional view of an example of a cooling arrangement for a torch igniter showing the flow of air through an air swirl hole.

FIG. 5A is a cross-sectional view of cap section 134 of torch igniter 110. Channels 128 in cap section 134 turn back 180° and form a dual-layer structure with the outer layer connected to air swirl holes 170, allowing channels 128 to cool igniter wall 138 along the entire inner surface of cap section 134 before being passed through to combustion chamber 116 by air swirl holes 170, as shown by arrows 182. Air swirl holes 170 extend through the inner portion of channels 128 embedded in cap section 134. Air exiting air swirl holes 170 enters combustion chamber 116 transversely with respect to the both flow direction and axis A'-A'. Further, air swirl holes 170 are generally canted with respect to the inner surface of igniter wall 138, such that air exiting air swirl holes 170 takes a swirling path through combustion chamber 116, as described above with respect to metering holes 168.

Figure 5B:
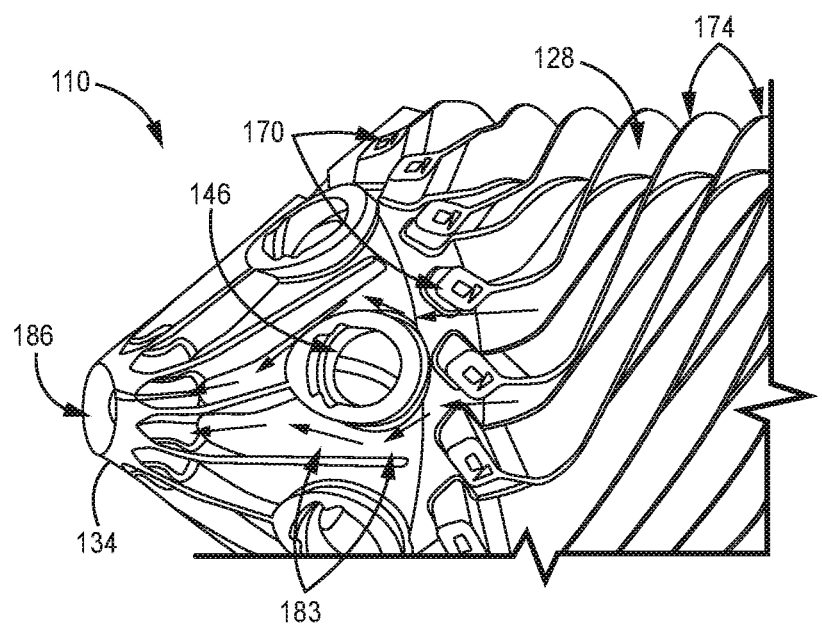
FIG. 5B is a cutaway view of an example of a cooling arrangement for a torch igniter illustrating the flow of air around the cap region of the torch igniter.

FIG. 5B is a cutaway view of the inner portion of the dual-layer structure adopted by channels 128 in cap section 134. Air leaving the helical section of channels 128 in combustion section 132 passes through a gap to enter cap section 134. In this example, the ratio of channels 128 in the helical section to channels 128 embedded in cap section 134 is roughly 3:1, such that air leaving the section of channels 128 surrounding the combustion chamber converge to a smaller number of channels 128 embedded in cap section 134, adopting a flow path shown by arrows 183. Channels 128 flow air around glow plug housing 146 before turning the air 180° to flow toward air swirl hole 170. FIG. 5B also depicts aperture 186, which receives fuel injector 144.

Figure 5C:
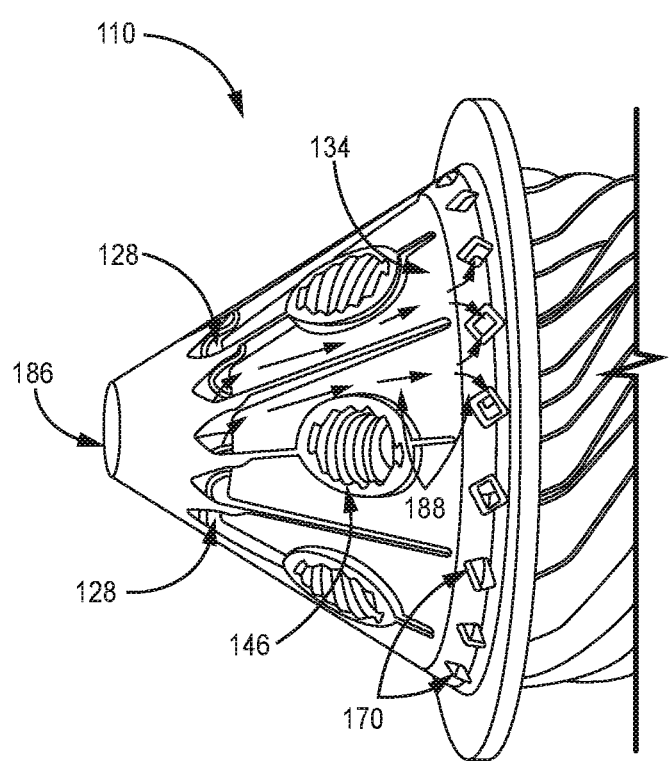
FIG. 5C is a cutaway view of an example of a cooling arrangement for a torch igniter illustrating the flow of air around the cap region of the torch igniter.

FIG. 5C is a cutaway view of the outer portion of the dual-layer structure of channels 128 in cap section 134. Channels 128 turn the flow of air approximately 180° between the inner and outer portions of cap section 134. Air flows around glow plug housing 146 along the path indicated by arrows 188 toward air swirl holes 170. In the depicted example, the ratio of channels 128 to air swirl holes 170 is roughly 1:3, such that the air leaving each of channels 128 can diverge into multiple air swirl holes 170.

Figure 6:
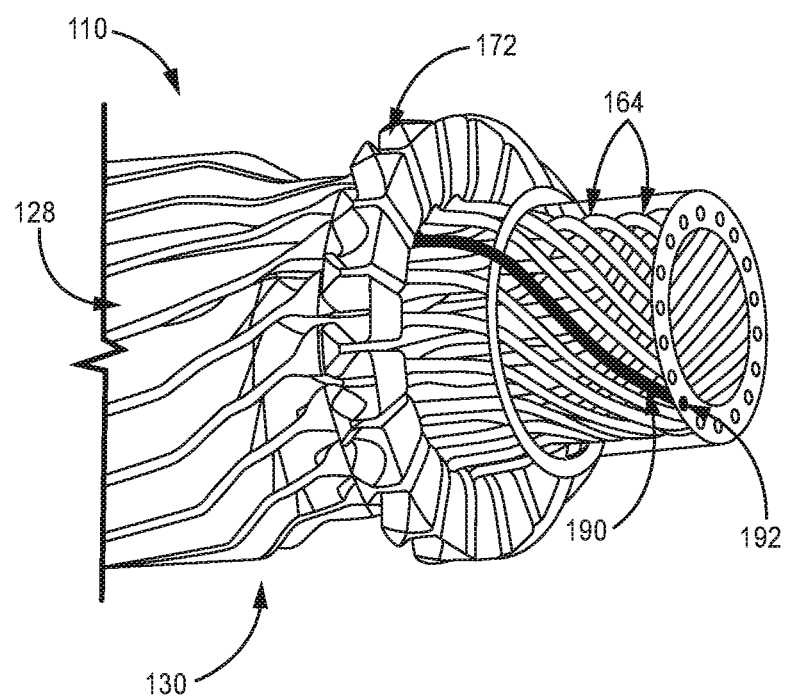
FIG. 6 is a cutaway view of an example of a cooling arrangement for the tip region of a torch igniter.

FIG. 6 is a cutaway view of helical outlets 164 in tip section 130 of torch igniter 110. Generally, helical outlets 164 cool the section of torch igniter 110 engaged by a seal in combustor liner 122. Helical outlets 164 have axial sections 190 and tip holes 192. A portion of air entering an inlet 172 is diverted through the axial sections 190 of helical outlets 164. The diverted air exits via tip holes 192 to an inner section of main combustor 123. The amount of air diverted through helical outlets 164 is limited to prevent the formation of a cold streak on the interior of the combustor. The portion of air diverted from channels 128 to helical outlets 164 may be approximately 5% in the depicted configuration, though it is to be understood that any appropriate amount of air (i.e., an amount of air that does not cause a cold streak in the interior of the combustor, and that is adequate for the cooling of tip section 130) may be diverted to helical outlets 164. In the depicted example, each of inlets 172 is fluidly connected to a single helical outlet 164. However, it is to be understood that the ratio of helical outlets 164 to inlets 172 could be varied, such that each inlet 172 connects to multiple helical outlets 164 or multiple inlets 172 connect to a single helical outlet 164.

FIGS. 7A-7D depict configurations of temperature-quenching systems that can be used to cool combustion gases leaving a torch igniter. These configurations are especially useful where the tip section of the torch igniter is elongated or takes a curved, non-linear shape and cooling passages in the torch igniter cannot extend through the entire tip region due to geometric or operational constraints.

Figure 7A:
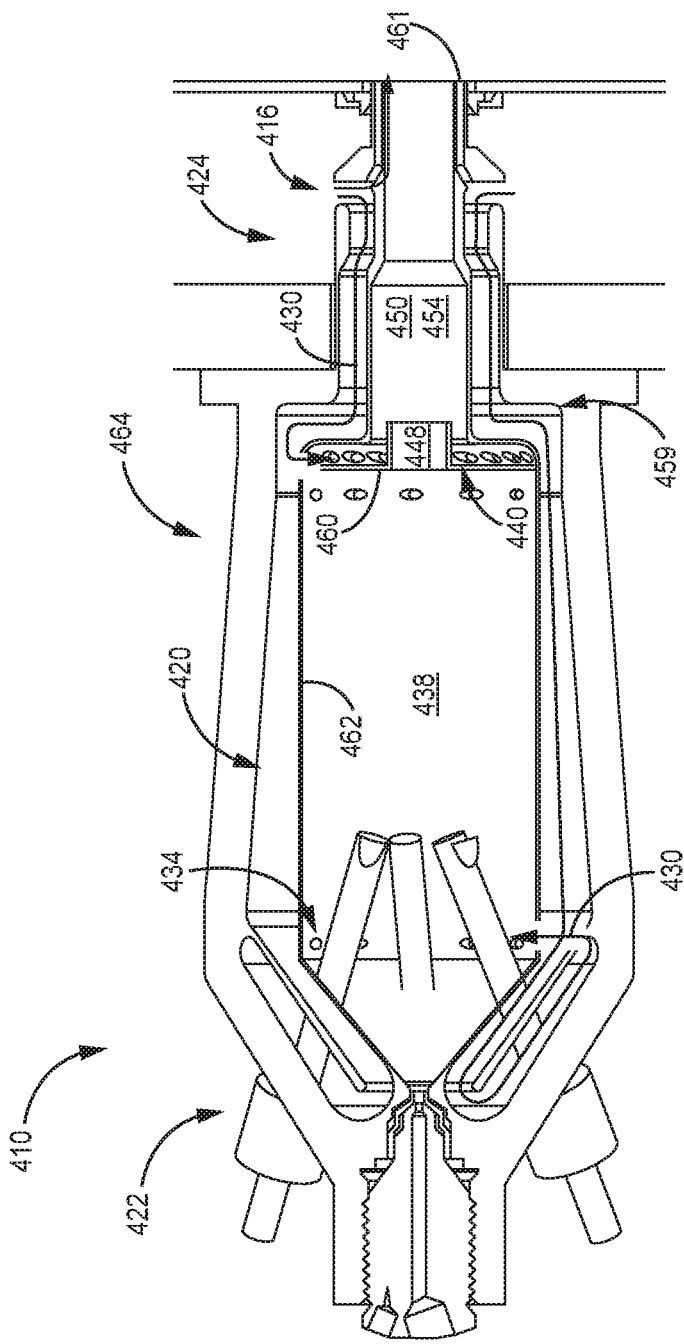
FIG. 7A shows an example of a temperature quenching system for use with a torch igniter.

FIG. 7A shows an example of a temperature quenching system for use with torch igniter 410. Components of torch igniter 410 are arranged similarly to those of torch igniter 10, except for the addition of a temperature quenching system. Air enters torch igniter 410 through radial inlet 416 and travels through channels 420 toward cap region 422, as indicated by arrows 430. Before air turns in cap region 422 to travel back toward tip section 424 and air swirl holes 434 and enter combustion chamber 438, a portion of air traveling toward tip section 424 is diverted through quench holes 440. Thus, gases exiting combustion chamber 438 through mixing nozzle 448 are able to mix with air diverted through quench holes 440 in quenching zone 450, which is substantially co-spatial with outlet passage 454. Specifically, quenching zone 450 extends from divider 460 to downstream end 461 of tip section 424 and thereby includes outlet passage 454 as well as the space surrounding mixing nozzle 448 between elbow region 459 and divider 460. Divider 460 functions to separate combustion occurring in combustion chamber 438 from temperature quenching occurring in quenching zone 450. Thus, all gases entering quenching zone 450 from combustion chamber 438 must pass through mixing nozzle 448. Combustion gases leaving quenching zone 450 enter a combustor in a gas turbine engine.

Divider 460 is generally annular and extends from mixing nozzle 448 radially outward to igniter wall 462 in combustion section 464 of torch igniter 410. Quench holes 440 extend through igniter wall 462 in combustion section 464 of torch igniter 410 and are arranged in an annular pattern. Quench holes 440 may in some examples be canted with respect to an inner surface of igniter wall 462. Mixing nozzle 448 is annular and extends generally in the direction of flow through torch igniter 410. Mixing nozzle 448 is shown to have a uniform diameter and extends outward from divider 460 at approximately a 90° angle. However, it should be understood that mixing nozzle 448 can have a non-uniform diameter, can take a non-annular shape, and can extend from divider 460 at any suitable angle.

Up to 50% of airflow through channels 420 can be diverted through quench holes 440 to be used to cool hot combustion gases. To ensure that sufficient air remains to be used to cool torch igniter 410 and be used subsequently for combustion in combustion chamber 438, channels 420 can have substantially larger volume than channel 28 of torch igniter 10 or channels 128 of torch igniter 110, at least in the region of channels 420 connecting inlet 416 to quenching holes 440.

Similarly, to facilitate effective mixing and temperature quenching of air within quenching zone 450, outlet passage 454 can be sized to have a substantially larger volume than outlet passage 40 of torch igniter 10 or outlet passage 140 of torch igniter 110. Furthermore, elbow region 459 can be formed at a non-90° angle to expand the area available between divider 460 and elbow region 459 and thereby increase the volume available in quenching zone 450 to mix air flowing through quench holes 440 with hot combustion gases.

Figure 7B:
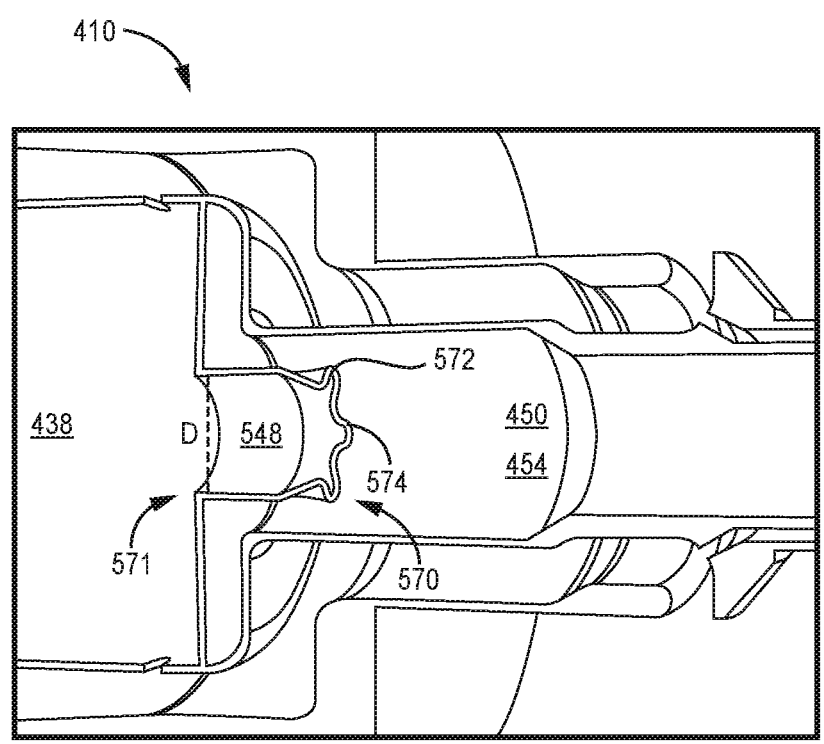
FIG. 7B shows an example of a mixing nozzle for improving mixing in a quenching zone of a torch igniter.

FIG. 7B shows an example of mixing nozzle 548 for improving mixing in quenching zone 450. Mixing nozzle 548 improves mixing within quenching zone 450 by funneling hot combustion gases through a contoured structure at downstream end 570 of mixing nozzle 448. However, upstream end 571 is still substantially annular and has a diameter D. Downstream end 570 is contoured to have symmetrically-distributed protrusions 572 and indents 574, which are shaped such that the diameter between two diametrically-opposed protrusions 572 is greater than diameter D and the diameter of mixing nozzle 448 between two diametrically-opposed indents 574 is less than diameter D.

Figure 7C:
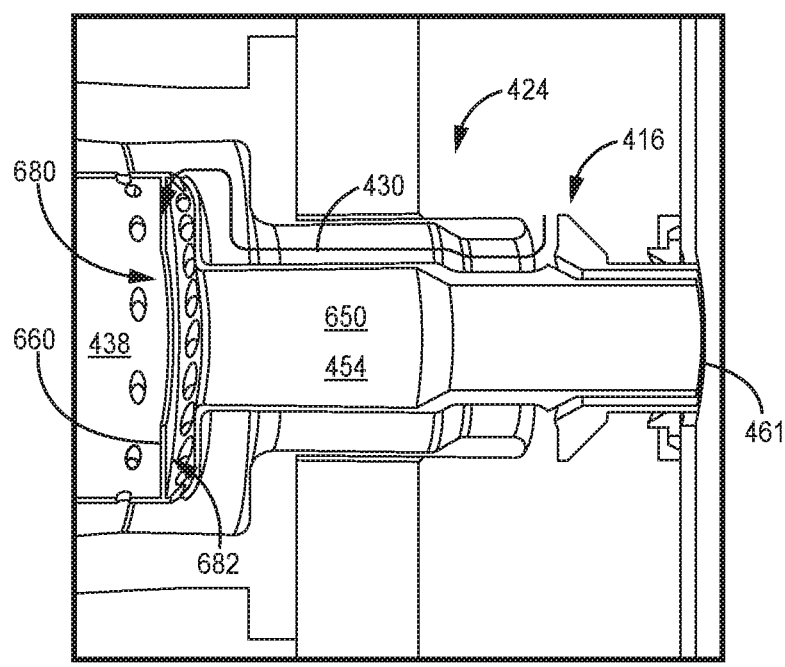
FIG. 7C shows an alternative example of a quenching system for a torch igniter.

FIG. 7C shows an example of a quenching system for torch igniter 410 that lacks mixing nozzle 448. In some applications, mixing nozzles 448 and 548 may be exposed to hot combustion cases and therefore the axially-extending portions of mixing nozzles 448 and 548 can experience unwanted thermal stress, potentially shortening their operational lifespan. Accordingly, in one embodiment, divider 660 of a quenching zone 650 has an aperture 680 that is able to communicate combustion gases from combustion chamber 438 to quenching zone 650 in lieu of mixing nozzle 448.

In examples of torch igniter 410 having aperture 680, quenching zone 650 extends axially from downstream face 682 of aperture 680 to downstream tip end 461. Aperture 680 has a circular cross section that is depicted as having a larger diameter than a diameter of outlet passage 454. However, it should be understood aperture 680 can have a diameter substantially the same as or smaller than the diameter of outlet passage 454, and further that aperture 680 can adopt any suitable shape for creating quenching zone 650 and channeling combustion gases from combustion chamber 438.

Figure 7D:
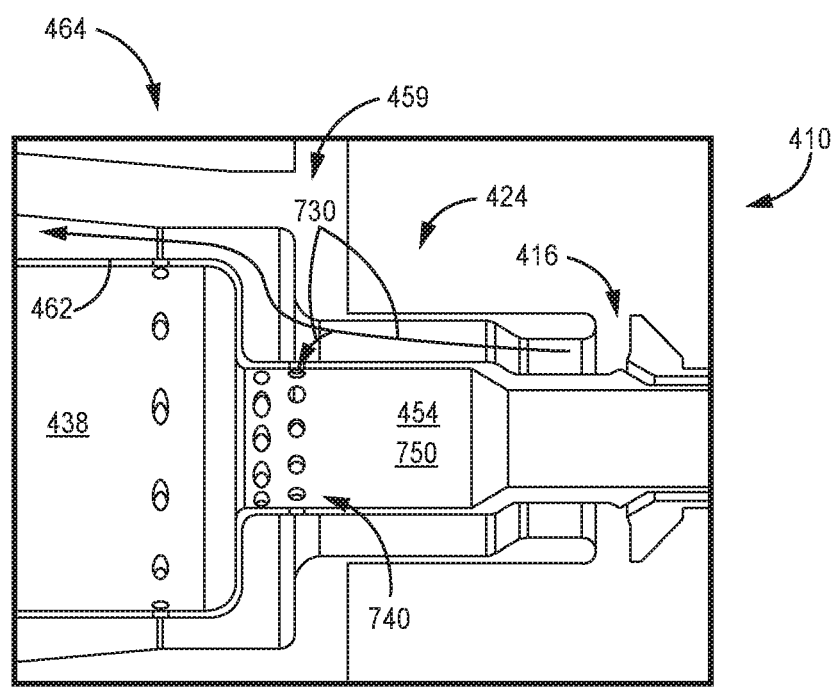
FIG. 7D shows an alternative example of a quenching system for a torch igniter.

FIG. 7D shows an alternative example of a quenching system for torch igniter 410. In this example, torch igniter 410 has quench holes 740 and quenching zone 750, and lacks divider 460 and mixing nozzle 448. Quench holes 740 function similarly to quench holes 440 and divert a portion of air flowing from inlet 416 toward cap section 422, as shown by arrows 730. Notably, quench holes 740 are extend through igniter wall 462 within tip section 424 rather than combustion section 464, as quench holes 440 are shown in FIG. 7A. This configuration allows for simplified construction of torch igniter 410. Air flowing through quench holes 740 can mix directly into gases exiting combustion chamber 438 into outlet passage 454. Quenching zone 750 is substantially co-spatial with outlet passage 454 and extends axially from quenching holes 740 to downstream tip end 461. Consequently, quenching zone 750 can occupy a smaller volume than outlet passage 454, unlike quenching zone 450, which occupies a larger volume than outlet passage 454. Notably, while in the depicted example quench holes 740 are shown to be disposed in elbow region 459 near combustion chamber 438, they can be disposed at any suitable location in tip section 424 for cooling hot combustion gases passing through tip section 424.

In summary, a torch igniter described herein can possess at least four distinct flow paths: (1) from inlets 172 to air swirl holes 170 and into combustion chamber 116; (2) from inlets 172 to metering holes 168 and into combustion chamber 116; (3) from inlets 172 through helical outlets 162 and tip holes 192 into a combustor; and (4) from inlets 172 into a quenching zone, such as quenching zones 450, 650, or 750. In examples of a torch igniter lacking a quenching zone and therefore only possessing flow paths (1), (2), and (3), the ratio of air flowing through flow paths (1), (2), and (3) is approximately 48/48/4, respectively. In examples of a torch igniter possessing all four flow paths, the ratio of air flowing through flow paths (1), (2), (3), and (4) is approximately 24/24/2/50, respectively. While the torch igniters described herein are described generally as having four distinct flow paths, it should be understood that the torch igniters described herein can be configured to flow air through any suitable number of flow paths, including more than four flow paths. Further, the torch igniters herein can be configured to have fewer than four flow paths.

Advantageously, the cooling arrangements disclosed herein allow for torch igniters 10, 110, or 410 to be formed from only metallic materials. In particular, the helical geometry of helical channels 128 and helical outlets 164 possessed by torch igniter 110 substantially improves the cooling of igniter wall 138 by increasing the surface area available for cooling, allowing for the construction of torch igniter 110 entirely from metallic components. This eliminates the need for the use of, for example, ceramic materials to shield metal components of the hot combustion gases generated by the torch igniters disclosed herein. Notably, forming a torch igniter that does not include a mixture of ceramic and metallic materials eliminates the need for additional support structures or vibration isolation features within the torch igniters disclosed herein and facilitates construction of the torch igniters using additive manufacturing. The torch igniters disclosed herein also do not require seals between metallic and ceramic components, further reducing the likelihood of leakage of hot combustion gases or cooling airflow. Forming torch igniters 10, 110, or 410 are formed as a monolithic structure further reduces the likelihood of leakage of hot combustion gases or cooling airflow.

More generally, all components of any torch igniter disclosed herein can be formed partially or entirely by additive manufacturing. For metal components (e.g., Inconel, steel, etc.) exemplary additive manufacturing processes include but are not limited to powder bed fusion techniques such as direct metal laser sintering (DMLS), laser net shape manufacturing (LNSM), electron beam manufacturing (EBM). Support-free additive manufacturing techniques, such as binder jetting, can also be used to form components of any torch igniter disclosed herein. Additive manufacturing is particularly useful in obtaining unique geometries (e.g., helical sections of channels 128 and helical outlets 164 of torch igniter 110) and for reducing the need for welds or other attachments (e.g., between tip section 130, combustion section 132, and cap section 134 of torch igniter 110). However, other suitable manufacturing process can be used. For example, any or all of tip section 30, combustion section 32, and cap section 34 can be fabricated separately and joined via later manufacturing steps (e.g., brazing, welding, or compression fitting) to form torch igniter 10. Similarly, in some examples, tip section 130, combustion section 132, and cap section 134 can in some examples be fabricated separately and joined via later manufacturing steps to form torch igniter 110.

Discussion of Possible Embodiments

The following are non-exclusive descriptions of possible embodiments of the present invention.

An embodiment of a torch igniter for a combustor of a gas turbine engine, wherein the torch igniter comprises a combustion chamber oriented about an axis, a cap defining the axially upstream end of the combustion chamber and oriented about the axis, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, and a cooling system. The combustion chamber has upstream and downstream ends defining a flow direction through the combustion chamber along the axis, the cap is configured to receive a fuel injector and a glow plug, and the outlet passage fluidly connects the combustion chamber to the combustor of the gas turbine engine. The cooling system comprises an air inlet formed within the structural wall, a first flow path disposed between the structural wall and the igniter wall and extending from the inlet to the cap, and an aperture extending transverse to the flow direction through the igniter wall. The air inlet is configured to intake a flow of air from a compressor section of the gas turbine engine. The first flow path is configured to receive a first portion of the air taken in by the inlet. The aperture directly fluidly connects the first flow path to the combustion chamber.

The torch igniter of the preceding paragraph can optionally include, additionally and/or alternatively, any one or more of the following features, configurations and/or additional components:

A torch igniter for a combustor of a gas turbine engine according to an exemplary embodiment of the foregoing torch igniter, among other possible things includes a combustion chamber oriented about an axis, a cap defining the axially upstream end of the combustion chamber and oriented about the axis, a tip defining the axially downstream end of the combustion chamber, an igniter wall extending from the cap to the tip and defining a radial extent of the combustion chamber, a structural wall coaxial with and surrounding the igniter wall, an outlet passage defined by the igniter wall within the tip, and a cooling system. The combustion chamber has upstream and downstream ends defining a flow direction through the combustion chamber along the axis, the cap is configured to receive a fuel injector and a glow plug, and the outlet passage fluidly connects the combustion chamber to the combustor of the gas turbine engine. The cooling system comprises an air inlet formed within the structural wall, a first flow path disposed between the structural wall and the igniter wall and extending from the inlet to the cap, and an aperture extending transverse to the flow direction through the igniter wall. The air inlet is configured to intake a flow of air from a compressor section of the gas turbine engine. The first flow path is configured to receive a first portion of the air taken in by the inlet. The aperture directly fluidly connects the first flow path to the combustion chamber.

A further embodiment of the foregoing torch igniter, wherein the first flow path comprises a first section surrounding the combustion chamber and a second section disposed within the cap.

A further embodiment of any of the foregoing torch igniters, wherein the second section is configured to first flow air toward an axially upstream end of the cap and then to turn the flow of air at the axially upstream end of the cap to flow toward the downstream end of the torch igniter.

A further embodiment of any of the foregoing torch igniters, wherein the igniter wall is annular and a radius of the combustion chamber is greater than a radius of the outlet passage, forming an elbow region at a downstream end of the combustion chamber.

A further embodiment of any of the foregoing torch igniters, wherein the first flow path extends axially through the tip, radially through the elbow region, and axially through the combustion chamber.

A further embodiment of any of the foregoing torch igniters, further comprising a second flow path disposed between the structural wall and the igniter wall and extending from the inlet to a downstream end of the combustion chamber.

A further embodiment of any of the foregoing torch igniters, wherein the second flow path is configured to receive a second portion of air flowing taken in by the inlet.

A further embodiment of any of the foregoing torch igniters, wherein the tip is attached to the combustor, the outlet passage is fluidly connected to an interior volume of the combustor, the air inlet is positioned outside of the combustor in a high-pressure case of the gas turbine engine, and the air taken in by the air inlet is compressed air.

A further embodiment of any of the foregoing torch igniters, wherein the cooling system further comprises a tip hole in an exterior of the tip that directly fluidly connects the third flow path to the interior volume of the combustor, such that air flowing through the second flow path is able to flow into the combustor.

A further embodiment of any of the foregoing torch igniters, wherein the first flow path, second flow path, or first and second flow paths have a helical shape.

A further embodiment of any of the foregoing torch igniters, wherein the torch igniter is formed by additive manufacturing.

A further embodiment of any of the foregoing torch igniters, wherein at least two portions of the torch igniter are each formed monolithically and attached by an additional manufacturing step.

A further embodiment of any of the foregoing torch igniters, wherein the air inlet is disposed adjacent to the tip of the torch igniter.

A further embodiment of any of the foregoing torch igniters, wherein the torch igniter further comprises a glow plug received through the cap and the glow plug has a first end that extends into the combustion chamber and a second end opposite the first that extends away from the combustion chamber.

A further embodiment of any of the foregoing torch igniters, wherein the aperture is disposed in the igniter wall at a position upstream of the first end of the glow plug.

A further embodiment of any of the foregoing torch igniters, wherein the torch igniter further comprises a metering hole disposed in the igniter wall at a position downstream of the first end of the glow plug that directly fluidly connects the cooling channel to the combustion chamber at a position in the flow path before the aperture.

A further embodiment of any of the foregoing torch igniters, wherein the metering hole is configured to divert a third portion of the air flowing toward the aperture into the combustion chamber before it reaches the aperture.

A further embodiment of any of the foregoing torch igniters, wherein the igniter wall is annular and a radius of the combustion chamber is greater than a radius of the outlet passage, forming an elbow region at a downstream end of the combustion chamber; and the metering hole is disposed adjacent to the elbow region and is configured to flow the diverted third portion of the air across an interior portion of the igniter wall at the elbow region.

A further embodiment of any of the foregoing torch igniters, wherein the torch igniter further includes fins extending radially outward from the igniter wall to the structural wall that split the first flow path into a plurality of flow paths, wherein the fins are configured to conduct heat from the igniter wall.

A further embodiment of any of the foregoing torch igniters, wherein the fins are configured to transfer heat from the igniter wall to the structural wall and the structural wall is configured to act as a cooling sink.

A further embodiment of any of the foregoing torch igniters, further comprising a quench hole disposed at a downstream location of the combustion chamber.

A further embodiment of any of the foregoing torch igniters, wherein the quench hole fluidly connects the first flow path to the outlet passage, is configured to divert a portion of the air flowing through the first flow path to the outlet passage to cool combustion gases flowing through the outlet passage.

A further embodiment of any of the foregoing torch igniters, wherein the cap, combustion chamber, and tip are oriented about an axis and the direction of flow is coaxial with the axis.

An embodiment of a method of cooling a torch igniter in a gas turbine engine, wherein the method comprises intaking a flow of air from a compressor section of the gas turbine engine at an air inlet formed in a structural wall of an igniter, flowing a first portion of the air through a first flow path disposed between the structural wall and an igniter wall and flowing the first portion of the air into through an aperture that directly fluidly connects the first flow path to the combustion chamber. The structural wall extends coaxially with and surrounds an igniter wall. The igniter wall defining a combustion chamber within the torch igniter. The first flow path extends from the inlet toward a cap defining an upstream end of the torch igniter.

The method of the preceding paragraph can optionally include, additionally and/or alternatively, any one or more of the following features, configurations and/or additional components:

A method cooling a torch igniter in a gas turbine engine turbine engine according to an exemplary embodiment of the foregoing torch igniter including intaking a flow of air from a compressor section of the gas turbine engine at an air inlet formed in a structural wall of an igniter, flowing a first portion of the air through a first flow path disposed between the structural wall and an igniter wall and flowing the first portion of the air into through an aperture that directly fluidly connects the first flow path to the combustion chamber. The structural wall extends coaxially with and surrounds an igniter wall. The igniter wall defining a combustion chamber within the torch igniter. The first flow path extends from the inlet toward a cap defining an upstream end of the torch igniter.

A further embodiment of the foregoing method, wherein the igniter wall forms an outlet passage in a tip of the torch igniter, the outlet passage is disposed between and directly fluidly connects the combustion chamber to the combustor, the air inlet is positioned outside of the combustor in a high-pressure case of the gas turbine engine, and the air taken in by the air inlet is compressed air.

A further embodiment of any of the foregoing methods, further comprising flowing a second portion of the air through a second flow path disposed between the structural wall and the igniter wall.

A further embodiment of any of the foregoing methods, wherein the second flow path extends from the inlet to a tip defining a downstream end of the torch igniter.

A further embodiment of any of the foregoing methods, wherein the method further comprises flowing the second portion of the air into the interior volume of the combustor through a tip hole disposed at a downstream end of the tip.

A further embodiment of any of the foregoing methods, wherein the method further comprises metering the flow of air to the aperture by diverting some of the first portion of the air into the combustion chamber through a metering hole into the combustion chamber before flowing the air through the aperture, wherein the metering hole extends through the igniter wall.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A torch igniter for a combustor of a gas turbine engine, the torch igniter comprising:
   a combustion chamber oriented about an axis, the combustion chamber having axially upstream and downstream ends defining a flow direction through the combustion chamber along the axis;
   a cap defining the axially upstream end of the combustion chamber and oriented about the axis, wherein the cap is configured to receive a fuel injector and a glow plug;
   a tip defining the axially downstream end of the combustion chamber;
   an igniter wall extending from the cap to the tip and defining a radial extent of the combustion chamber;
   a structural wall coaxial with and surrounding the igniter wall;
   an outlet passage defined by the igniter wall within the tip, wherein the outlet passage fluidly connects the combustion chamber to the combustor of the gas turbine engine; and
   a cooling system comprising:
      an air inlet formed within the structural wall and configured to intake a flow of air from a compressor section of the gas turbine engine;
      a first flow path disposed between the structural wall and the igniter wall and extending from the air inlet to the cap, wherein the first flow path is configured to receive a first portion of the air taken in by the air inlet and the first flow path comprises:

a first section surrounding the combustion chamber; and a second section disposed within the cap, wherein the second section has a first subsection configured to first flow air toward an axially upstream end of the cap and a second subsection configured to then turn the flow of air at the axially upstream end of the cap to flow toward a downstream end of the torch igniter; and an aperture extending transverse to the flow direction through the igniter wall, wherein the aperture directly fluidly connects the second subsection to the combustion chamber.

2. The torch igniter of claim 1, wherein the igniter wall is annular and a radius of the combustion chamber is greater than a radius of the outlet passage, forming an elbow region at the downstream end of the combustion chamber.

3. The torch igniter of claim 2, wherein the first flow path extends axially through the tip, radially through the elbow region, and axially along the combustion chamber.

4. The torch igniter of claim 1, further comprising a second flow path disposed between the structural wall and the igniter wall and extending from the air inlet to the axially downstream end of the combustion chamber, wherein the second flow path is configured to receive a second portion of air flow taken in by the air inlet.

5. The torch igniter of claim 4, wherein the tip is attached to the combustor, the outlet passage is fluidly connected to an interior volume of the combustor, the air inlet is positioned outside of the combustor in a high-pressure case of the gas turbine engine, and the air taken in by the air inlet is compressed air.

6. The torch igniter of claim 5, the cooling system further comprising:

a tip hole in an exterior of the tip that directly fluidly connects the second flow path to the interior volume of the combustor, such that air flowing through the second flow path is able to flow into the combustor.

7. The torch igniter of claim 4, wherein at least one of the first flow path and the second flow path has a helical shape.

8. The torch igniter of claim 1, wherein the torch igniter is formed by additive manufacturing.

9. The torch igniter of claim 1, wherein the air inlet is disposed adjacent to the tip of the torch igniter.

10. The torch igniter of claim 1, further comprising fins extending radially outward from the igniter wall to the structural wall that split the first flow path into a plurality of flow paths, wherein the fins are configured to conduct heat from the igniter wall.

11. The torch igniter of claim 10, and further comprising:
a metering hole disposed in the igniter wall at a position downstream of the first end of the glow plug that directly fluidly connects the first flow path to the combustion chamber at a position in the flow path before the aperture, wherein the metering hole is configured to divert a third portion of the air flowing toward the aperture into the combustion chamber before it reaches the aperture.

12. The torch igniter of claim 11, wherein:
the igniter wall is annular and a radius of the combustion chamber is greater than a radius of the outlet passage, forming an elbow region at the axially downstream end of the combustion chamber; and the metering hole is disposed adjacent to the elbow region and is configured to flow the diverted third portion of the air across an interior portion of the igniter wall at the elbow region.

13. The torch igniter of claim 1, further comprising a quench hole disposed at a downstream location of the combustion chamber, wherein the quench hole fluidly connects the first flow path to the outlet passage and the quench hole is configured to divert a portion of the air flowing through the first flow path to the outlet passage to cool combustion gases flowing through the outlet passage.

14. The torch igniter of claim 1, wherein the cap, the combustion chamber, and the tip are oriented about the axis and the flow direction is coaxial with the axis.

15. The torch igniter of claim 1, wherein the aperture extends along a hole axis that is canted with respect to an interior surface of the igniter wall and is further configured to flow air with a swirl relative to the axis of the combustion chamber.

16. A method of cooling a torch igniter for a combustor in a gas turbine engine, the method comprising:

intaking a flow of air from a compressor section of the gas turbine engine at an air inlet formed in a structural wall of the torch igniter, wherein the structural wall extends coaxially with and surrounds an igniter wall, the igniter wall defining a combustion chamber within the torch igniter;

flowing a first portion of the air through a first flow path disposed between the structural wall and the igniter wall, wherein the first flow path extends from the air inlet toward a cap defining an upstream end of the torch igniter and the first flow path comprises:

a first section surrounding the combustion chamber; and a second section disposed within the cap, wherein the second section has a first subsection configured to first flow air toward an axially upstream end of the cap and a second subsection configured to then turn the flow of air at the axially upstream end of the cap to flow toward a downstream end of the torch igniter; and flowing the first portion of the air from the second subsection into through an aperture that directly fluidly connects the second subsection to the combustion chamber.

17. The method of claim 16, further comprising flowing a second portion of the air through a second flow path disposed between the structural wall and the igniter wall, wherein the second flow path extends from the inlet to a tip defining the downstream end of the torch igniter.

18. The method of claim 17, wherein the igniter wall forms an outlet passage in the tip of the torch igniter, the outlet passage is disposed between and directly fluidly connects the combustion chamber to the combustor, the air inlet is positioned outside of the combustor in a high-pressure case of the gas turbine engine, and the air taken in by the air inlet is compressed air, and further comprising flowing the second portion of the air into an interior volume of the combustor through a tip hole disposed at a downstream end of the tip.

* * * * *